(12) United States Patent
Troedson et al.

(10) Patent No.: US 11,775,022 B1
(45) Date of Patent: Oct. 3, 2023

(54) CASE STYLUS SYSTEM FOR PORTABLE ELECTRONIC DEVICE

(71) Applicant: Pioneer Square Brands, Inc., Seattle, WA (US)

(72) Inventors: Emelie Elna Victoria Troedson, Seattle, WA (US); Brian Lewis Piper, Seattle, WA (US)

(73) Assignee: Pioneer Square Brands, Inc., McLean, VA (US)

( * ) Notice: Subject to any disclaimer, the term of this patent is extended or adjusted under 35 U.S.C. 154(b) by 0 days.

(21) Appl. No.: 18/096,524

(22) Filed: Jan. 12, 2023

(51) Int. Cl.
| | |
|---|---|
| *G06F 1/06* | (2006.01) |
| *G06F 3/0354* | (2013.01) |
| *A45C 11/00* | (2006.01) |
| *G06F 1/16* | (2006.01) |

(52) U.S. Cl.
CPC ........ *G06F 1/1656* (2013.01); *G06F 3/03545* (2013.01); *A45C 2011/003* (2013.01); *G06F 2200/1632* (2013.01); *G06F 2200/1633* (2013.01)

(58) Field of Classification Search
CPC .......... A45C 2200/15; A45C 2011/003; A45C 2011/002; A45C 11/00; G06F 2200/1633; G06F 2200/1632; G06F 3/03545; G06F 1/1656
USPC ................................................ 206/811, 586
See application file for complete search history.

(56) References Cited

U.S. PATENT DOCUMENTS

| | | | | |
|---|---|---|---|---|
| 2,461,711 | A * | 2/1949 | Wewetzer | A45D 33/006 220/523 |
| 6,445,577 | B1 * | 9/2002 | Madsen | G06F 1/1628 206/320 |
| 6,473,076 | B1 * | 10/2002 | Thompson | G06F 1/26 345/173 |
| 6,646,864 | B2 * | 11/2003 | Richardson | G06F 1/1626 312/223.1 |
| 7,495,895 | B2 * | 2/2009 | Carnevali | G06F 1/1656 455/575.8 |
| 9,144,279 | B2 * | 9/2015 | Venida | A45C 15/00 |
| 10,135,480 | B1 * | 11/2018 | Zaloom | F16M 11/10 |
| 10,411,748 | B1 * | 9/2019 | Lucente | H04M 1/04 |
| 11,068,023 | B1 * | 7/2021 | Manzano | G03B 11/04 |
| 2003/0076302 | A1 * | 4/2003 | Langstraat | G06F 1/169 345/161 |
| 2004/0109285 | A1 * | 6/2004 | Lee | G06F 1/169 361/679.3 |
| 2004/0112143 | A1 * | 6/2004 | Richardson | G06F 1/1626 73/856 |

(Continued)

*Primary Examiner* — Chun Hoi Cheung
(74) *Attorney, Agent, or Firm* — Grandview Law

(57) ABSTRACT

Systems and methods involve a case assembly, stylus, cover assembly, and portable electronic device, the system includes a case assembly including an elongated aperture extending in a first direction through at least one interior wall portion and through at least one second exterior wall portion of a second side, the elongated aperture including an elongated linear dimension being the largest of a plurality of portions of an internal length dimension of an internal base surface of the case assembly; and including a cover assembly including a linear dimension at least as large as the elongated linear dimension of the elongated aperture. In addition, other aspects are described in the claims, drawings, and text forming a part of the present disclosure.

20 Claims, 34 Drawing Sheets

(56) References Cited

U.S. PATENT DOCUMENTS

| | | | |
|---|---|---|---|
| 2004/0145579 A1* | 7/2004 | Lilenfeld | G06F 3/03545 |
| | | | 345/179 |
| 2006/0044288 A1* | 3/2006 | Nakamura | G06F 3/03545 |
| | | | 345/179 |
| 2012/0261306 A1* | 10/2012 | Richardson | G06F 1/1633 |
| | | | 206/778 |
| 2014/0020947 A1* | 1/2014 | Richardson | H01F 38/14 |
| | | | 174/520 |
| 2014/0138265 A1* | 5/2014 | Bong | A45C 11/00 |
| | | | 206/37 |
| 2015/0055285 A1* | 2/2015 | Zheng | G06F 1/1626 |
| | | | 361/679.26 |
| 2015/0298859 A1* | 10/2015 | Amano | B65D 25/005 |
| | | | 361/679.56 |
| 2017/0108952 A1* | 4/2017 | Tang | G06F 3/03545 |
| 2023/0144918 A1* | 5/2023 | Zhong | F16M 11/041 |
| | | | 361/600 |

* cited by examiner

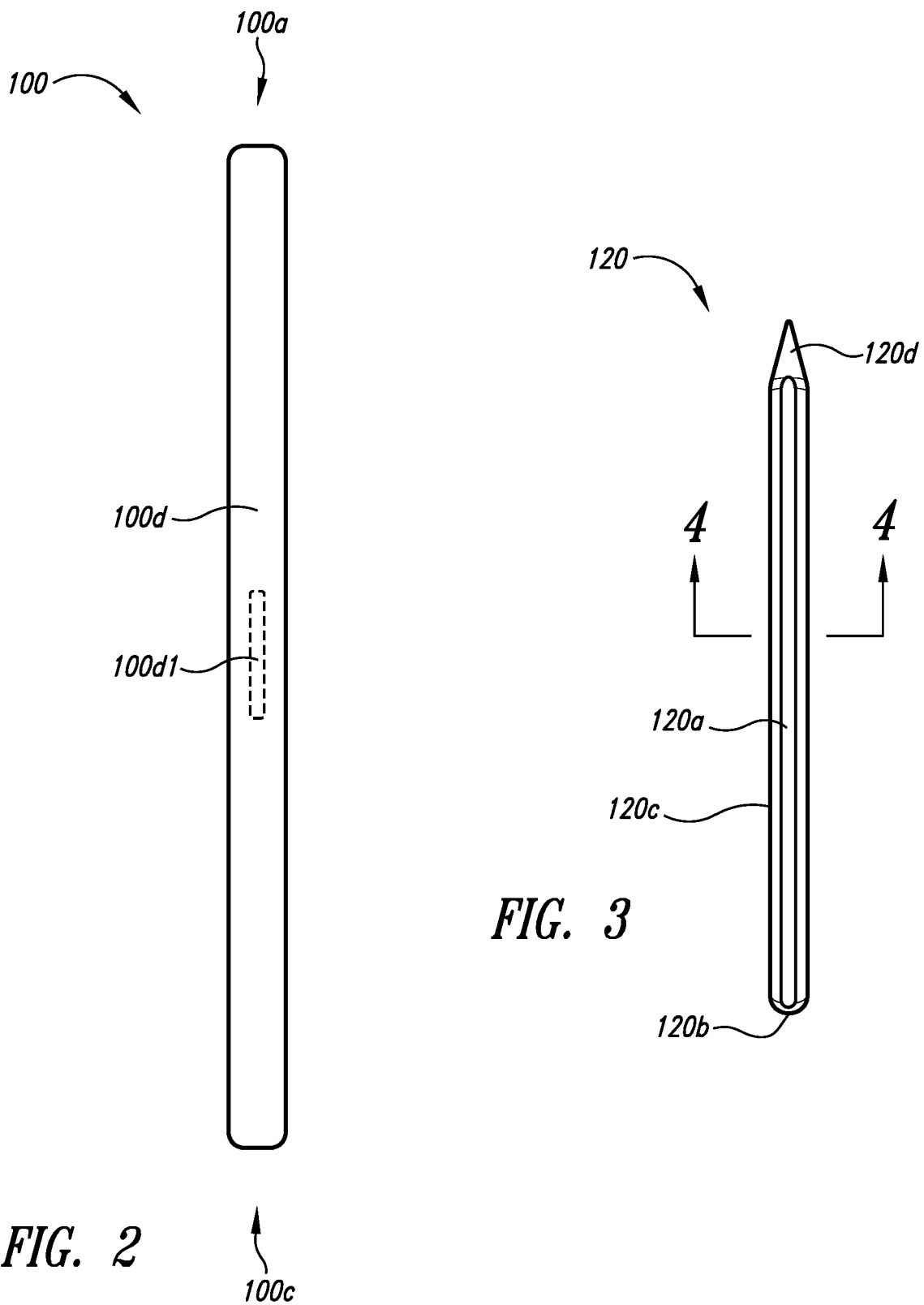

CASE STYLUS SYSTEM FOR PORTABLE ELECTRONIC DEVICE

SUMMARY

In one or more aspects a system for a portable electronic computing device, the system including (I) a case assembly including (A) at least one interior base surface including an internal length dimension, the internal length dimension of the interior base surface including a plurality of portions, (B) a first side including at least one first interior wall portion and at least one first exterior wall portion with the at least one first interior wall portion angularly extending relative to the at least one interior base surface, (C) a second side extending along the internal length dimension of the at least one interior base surface, the second side including at least one second interior wall portion and at least one second exterior wall portion with the at least one second interior wall portion angularly extending relative to the at least one interior base surface, and (D) a third side including at least one third interior wall portion and at least one third exterior wall portion with the at least one third interior wall portion angularly extending relative to the at least one interior base surface, wherein the internal length dimension of the internal base surface extends from the first interior wall portion to the third interior wall portion, wherein the at least one first interior wall portion extends perpendicularly to the second interior wall portion, wherein the at least one first interior wall portion extends parallel with the at least one third interior wall portion, and (E) an elongated aperture extending in a first direction through the at least one second interior wall portion and through the at least one second exterior wall portion of the second side, the elongated aperture extending an elongated linear dimension in a second direction perpendicular to the first direction, the second direction being parallel with the internal length dimension of the internal base surface, the elongated linear dimension of the elongated aperture being the largest of the plurality of portions of the internal length dimension of the internal base surface; and (II) a cover assembly sized and shaped to cover the elongated aperture of the case assembly when the cover assembly is coupled with the case assembly. Wherein the at least one second exterior wall portion of the case assembly includes at least one tab-receiving notch. Wherein the cover assembly includes at least one tab sized and shaped to be received by the at least one tab-receiving notch of the at least one second exterior wall portion. Wherein the at least one tab-receiving notch is positioned on the at least one second exterior wall portion adjacent the elongated aperture of the case assembly. Wherein the at least one second exterior wall portion includes at least one beveled surface portion extending adjacent the elongated aperture and parallel with the internal length dimension of the internal base surface and wherein the at least one tab-receiving notch is positioned on the at least one beveled surface portion. Wherein the elongated aperture and the least one beveled surface portion are shaped, sized, and positioned to receive at least one portable electronic device portable electronic device stylus. Wherein the elongated aperture extends in the second direction parallel with the internal length dimension of the internal base surface of the case assembly at least half the length of the internal length dimension of the internal base surface. Wherein the cover assembly including a length dimension at least as large as the elongated linear dimension of the elongated aperture. Wherein the length dimensions of the cover assembly is at least five inches and the elongated linear dimension of the elongated aperture is at least five inches. Wherein a top plan view of the cover assembly resembles a top plan view of at least one electronic device portable electronic device stylus. Wherein the cover assembly includes at least one concave surface. Wherein the cover assembly includes at least one internal brace. Wherein the cover assembly includes a pointed end. Wherein the cover assembly includes a rounded end.

In one or more aspects, a system including (I) a case assembly including (A) at least one interior base surface including an internal length dimension, the internal length dimension of the interior base surface including a plurality of portions, (C) a second side extending along the internal length dimension of the at least one interior base surface, the second side including at least one second interior wall portion and at least one second exterior wall portion with the at least one second interior wall portion angularly extending relative to the at least one interior base surface, and wherein the at least one first interior wall portion extends perpendicularly to the second interior wall portion, and (E) an elongated aperture extending in a first direction through the at least one second interior wall portion and through the at least one second exterior wall portion of the second side, the elongated aperture extending an elongated linear dimension in a second direction perpendicular to the first direction, the second direction being parallel with the internal length dimension of the internal base surface, the elongated linear dimension of the elongated aperture being the largest of the plurality of portions of the internal length dimension of the internal base surface. Wherein the at least one second exterior wall portion of the case assembly includes at least one tab-receiving notch positioned on the at least one second exterior wall portion adjacent the elongated aperture of the case assembly. Wherein the at least one second exterior wall portion includes at least one beveled surface portion extending adjacent the elongated aperture and parallel with the internal length dimension of the internal base surface and wherein the at least one tab-receiving notch is positioned on the at least one beveled surface portion.

In one or more aspects, a system including (I) a case assembly including (A) at least one interior base surface including an internal length dimension, the internal length dimension of the interior base surface including a plurality of portions, (C) a second side extending along the internal length dimension of the at least one interior base surface, the second side including at least one second interior wall portion and at least one second exterior wall portion with the at least one second interior wall portion angularly extending relative to the at least one interior base surface, and wherein the at least one first interior wall portion extends perpendicularly to the second interior wall portion, and (E) an elongated aperture extending in a first direction through the at least one second interior wall portion and through the at least one second exterior wall portion of the second side, the elongated aperture extending an elongated linear dimension in a second direction perpendicular to the first direction, the second direction being parallel with the internal length dimension of the internal base surface, the elongated linear dimension of the elongated aperture being the largest of the plurality of portions of the internal length dimension of the internal base surface; and (II) a cover assembly including a linear dimension at least as large as the elongated linear dimension of the elongated aperture. Wherein the cover assembly including a length dimension at least as large as the elongated linear dimension of the elongated aperture. Wherein a top plan view of the cover assembly resembles a top plan view of at least one electronic device portable electronic device stylus.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of a case stylus system for portable electronic device systems, articles of manufacture, compositions of matter for same that may provide context, for instance, in introducing one or more processes and/or devices described herein.

FIG. 2 is a side-elevational view of the portable electronic device of FIG. 1.

FIG. 3 is a bottom-plan view of a portable electronic device stylus.

DETAILED DESCRIPTION

Figure 1:
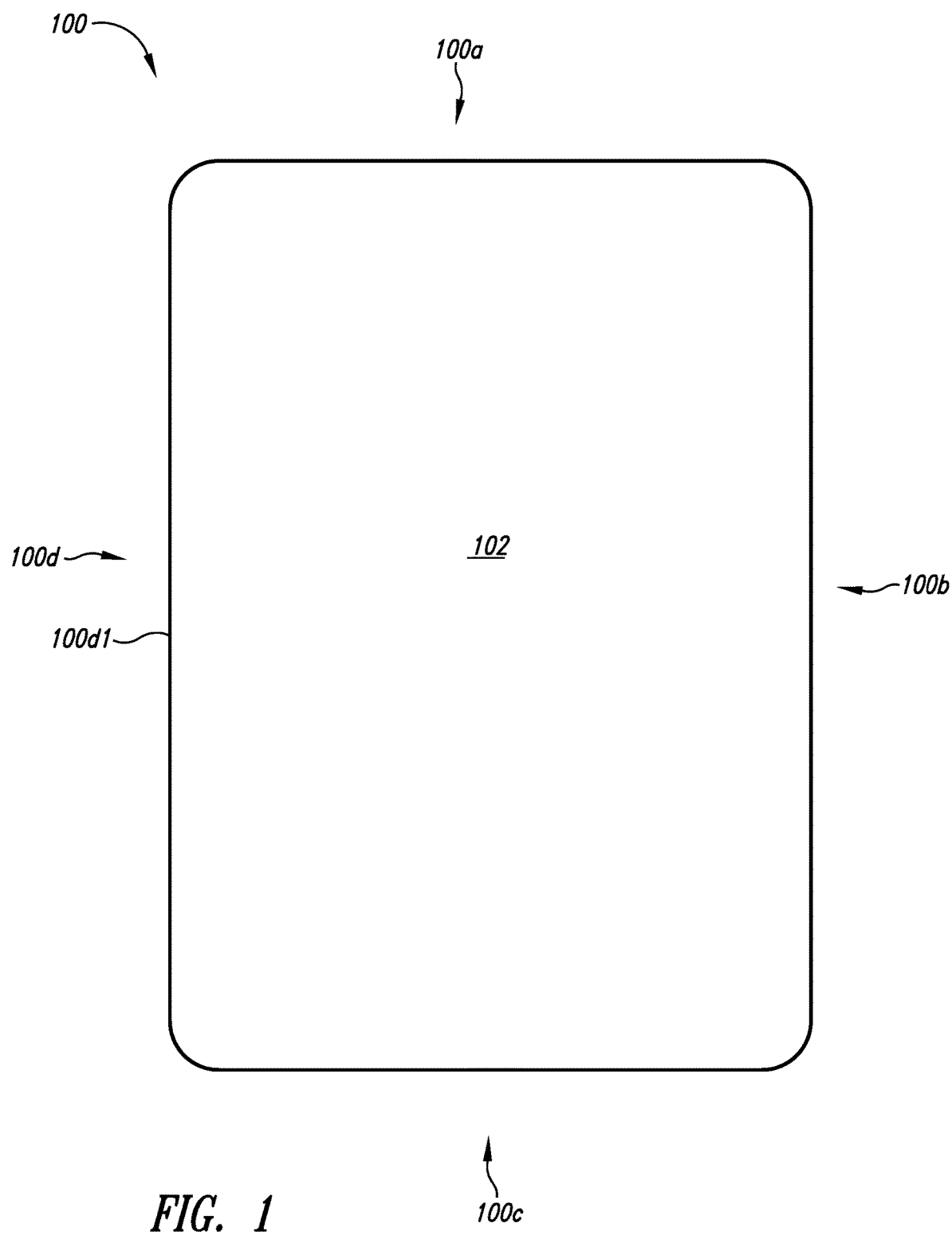
FIG. 1 is a top-plan view of a portable electronic device.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a top-plan view of portable electronic device 100. In implementations, portable electronic device 100 is shown to include side 100a, side 100b, side 100c, side 100d with portable electronic device stylus connector 100d1, and display surface 102. Implementations can include portable electronic device 100 being a tablet, laptop, mobile phone, etc.

Turning to FIG. 2, depicted therein is a side-elevational view of portable electronic device 100 showing detail of portable electronic device stylus connector 100d1, which in implementations can include one or more magnetic materials for stylus coupling further discussed herein.

Turning to FIG. 3, depicted therein is a bottom-plan view of portable electronic device stylus 120 including flattened surface 120a, end 120b, curvilinear surface 120c, and pointed tip 120d. In implementations, one or more magnetic materials can be positioned on or beneath flattened surface 120a to allow for coupling of portable electronic device stylus 120 with portable electronic device stylus connector 100d1 of portable electronic device 100.

Figure 4:
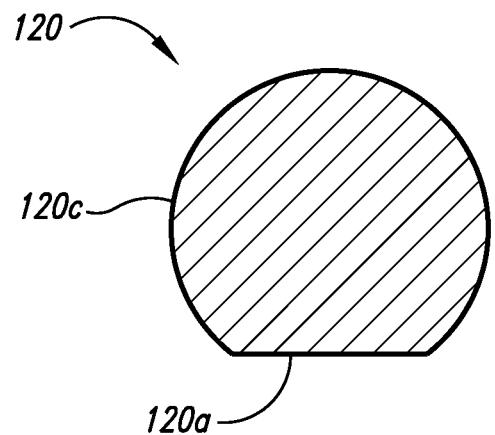
FIG. 4 is a cross-sectional view of the portable electronic device stylus of FIG. 3 taken along the 4-4 cut line of FIG. 3.

Turning to FIG. 4, depicted therein is a cross-sectional view of portable electronic device stylus 120 of FIG. 3 taken along the 4-4 cut line of FIG. 3.

Figure 5:
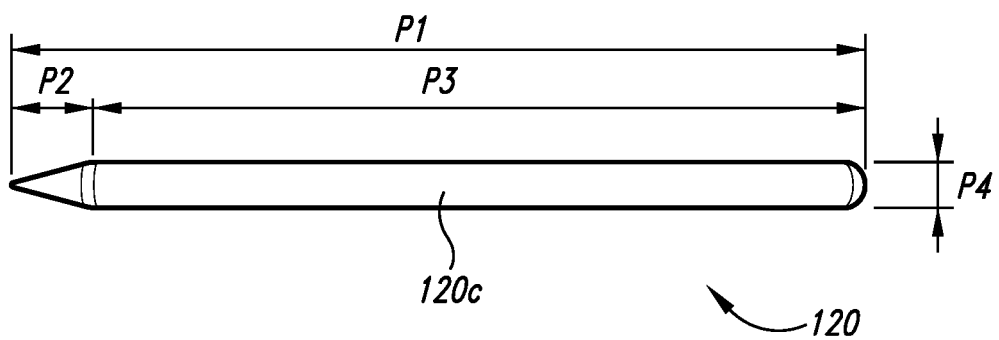
FIG. 5 is a top-plan view of the portable electronic device stylus of FIG. 3.

Turning to FIG. 5, depicted therein is a top-plan view of portable electronic device stylus 120, which is shown to include linear dimension P1, linear dimension P2, linear dimension P3, and linear dimension P4. In implementations linear dimension P1 can be 5 to 7 inches, such as 6.53 inches, and linear dimension P4 can be 0.3 to 0.5 inches, such as 0.35 inches. In other implementations other dimensions of other versions of portable electronic device stylus 120 can be used.

Figure 6:
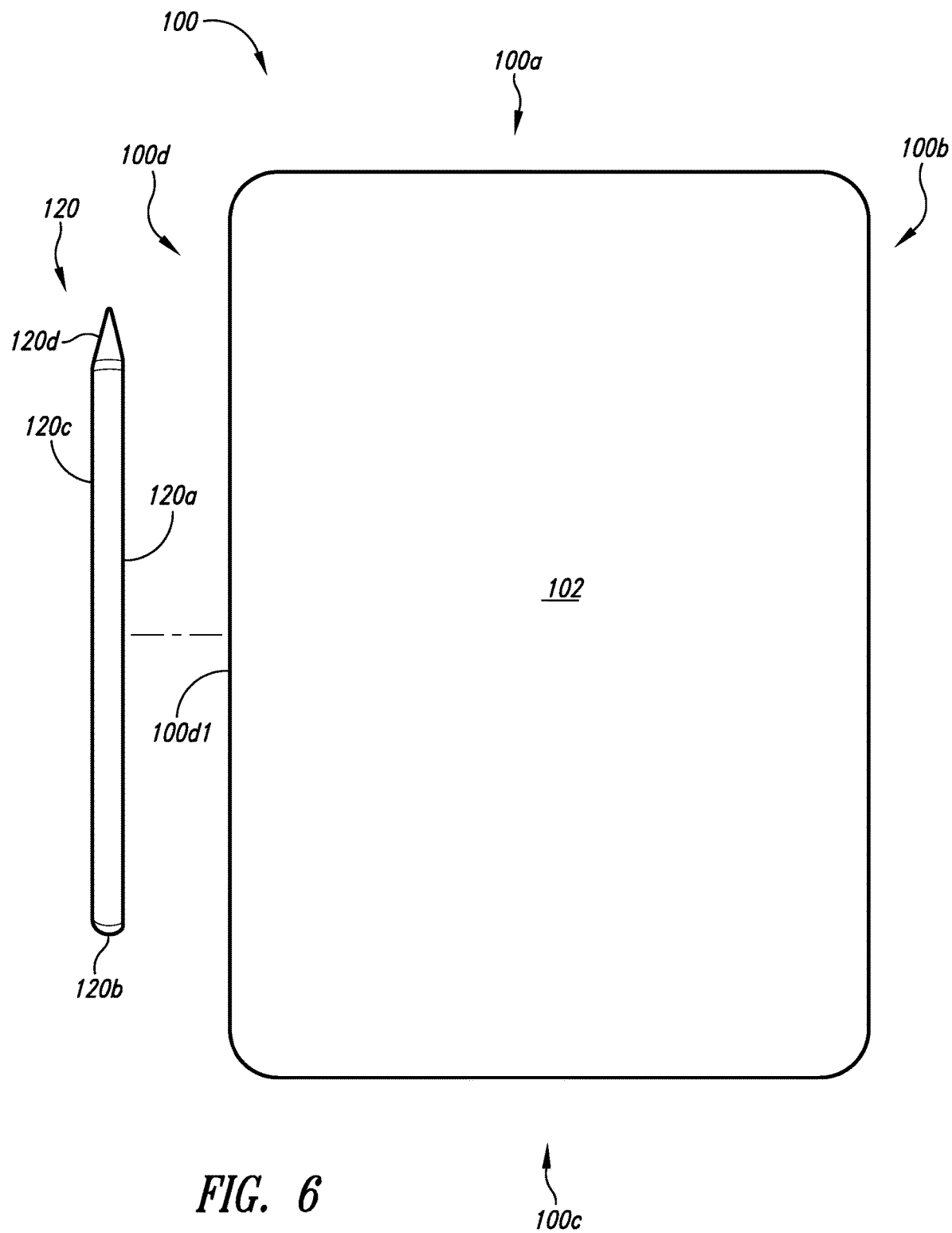
FIG. 6 is a top-plan view of the portable electronic device of FIG. 1 and the portable electronic device stylus of FIG. 3 with the portable electronic device stylus uncoupled from the portable electronic device.

Turning to FIG. 6, depicted therein is a top-plan view of portable electronic device 100 and portable electronic device stylus 120 as uncoupled from portable electronic device 100.

Figure 7:
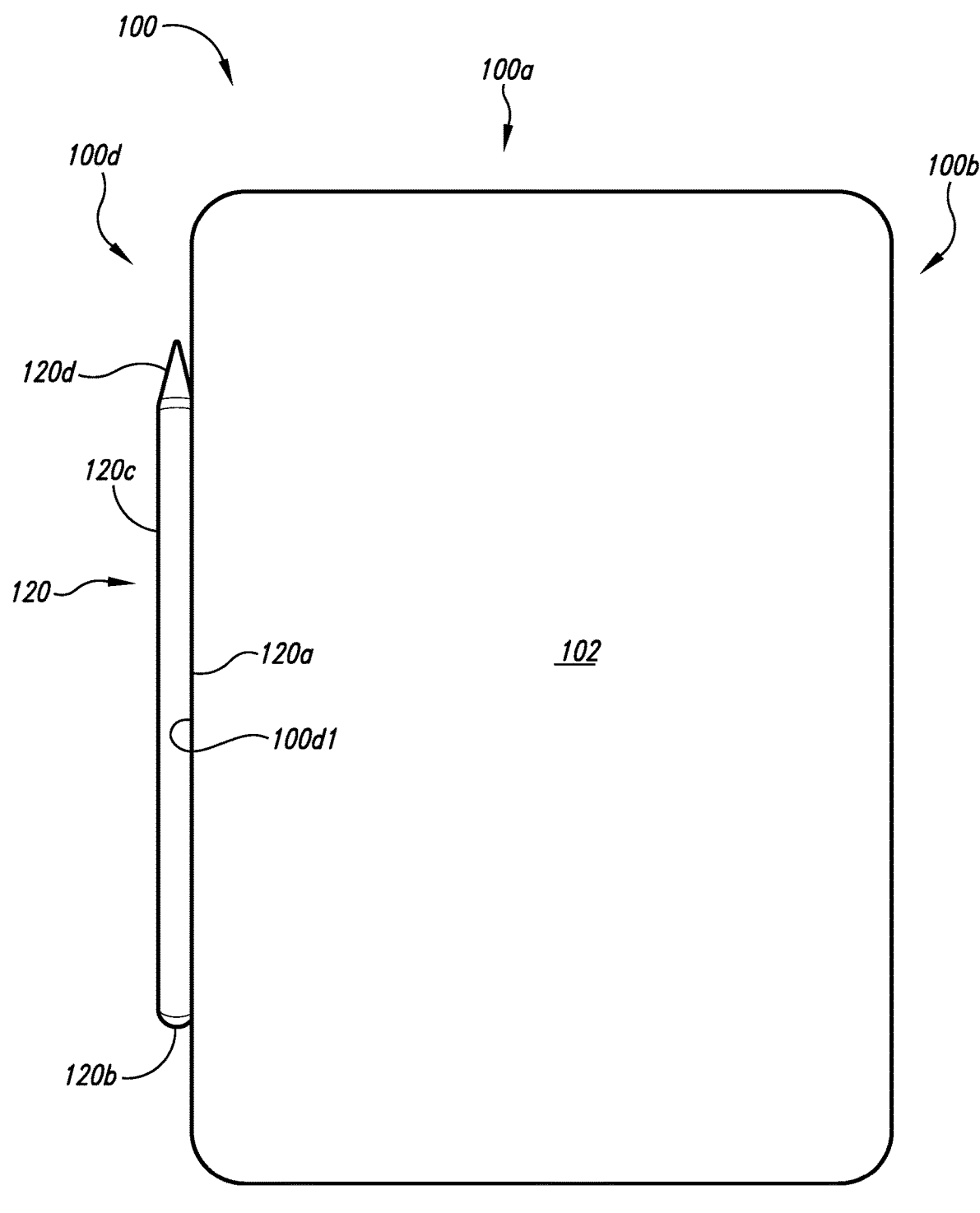
FIG. 7 is a top-plan view of the portable electronic device of FIG. 1 and the portable electronic device stylus of FIG. 3 with the portable electronic device stylus coupled with the portable electronic device.

Turning to FIG. 7 is a top-plan view of portable electronic device 100 and portable electronic device stylus 120 as coupled with portable electronic device 100.

Figure 8:
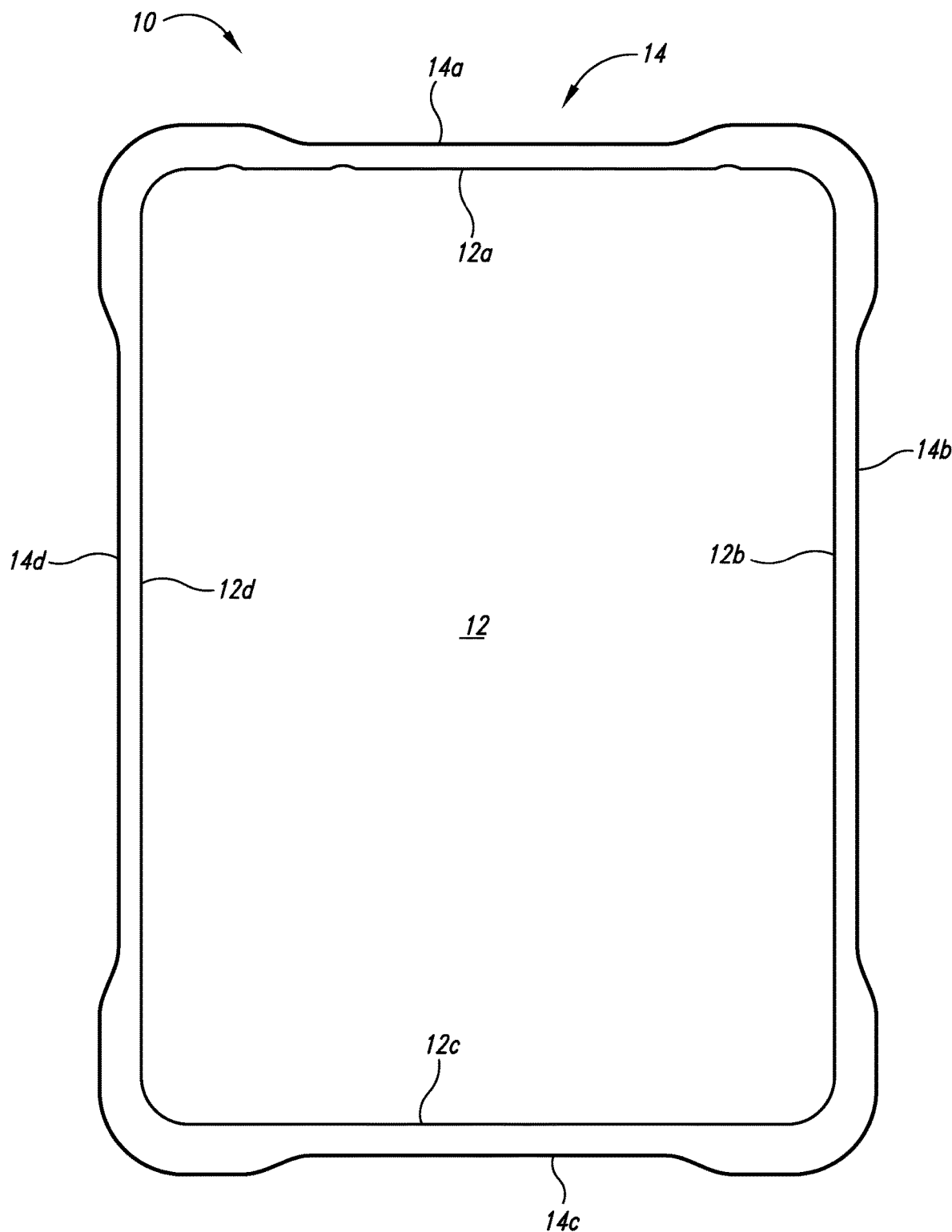
FIG. 8 is a top-plan view of a device case assembly for the portable electronic device of FIG. 1.

Turning to FIG. 8, depicted therein is a top-plan view of device case assembly 10 for portable electronic device 100. The device case assembly 10 is shown to include interior base surface 12, and exterior 14. The interior base surface 12 is shown to include interior wall portion 12a, interior wall portion 12b, interior wall portion 12c, and interior wall portion 12d. The exterior 14 is shown to include exterior wall portion 14a, exterior wall portion 14b, exterior wall portion 14c and exterior wall portion 14d. Implementations of one or more portions of device case assembly 10 can include at least one of the following materials: rigid plastic, polycarbonate, acrylonitrile butadiene styrene, thermoplastic polymer, thermoplastic polyurethane, polyethylene terephthalate, and nylon.

Figure 9:
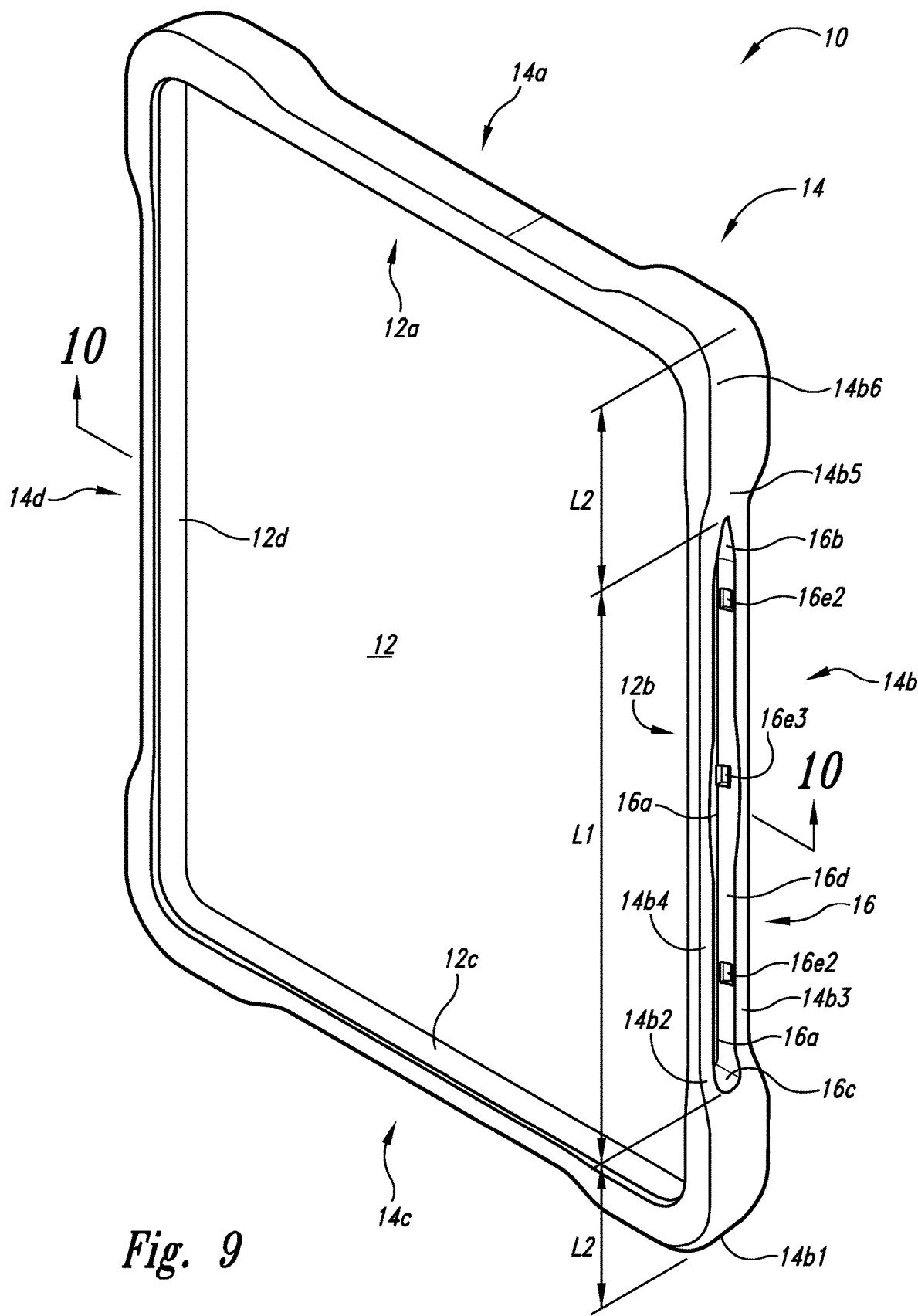
FIG. 9 is a front-perspective view of the device case assembly of FIG. 8.

Turning to FIG. 9, depicted therein is a front-perspective view of device case assembly 10 shown to include linear dimension L1 and linear dimension L2. The exterior wall portion 14b is shown to include corner 14b1, recess end 14b2, edge portion 14b3, edge portion 14b4, recess end 14b5, and corner 14b6. The portable electronic device stylus holder 16 is shown to include elongated aperture 16a, tip recess portion 16b, end recess portion 16c, beveled surface portion 16d, which is shown to include tab-receiving notch 16e2 and tab-receiving notch 16e3.

Figure 10:
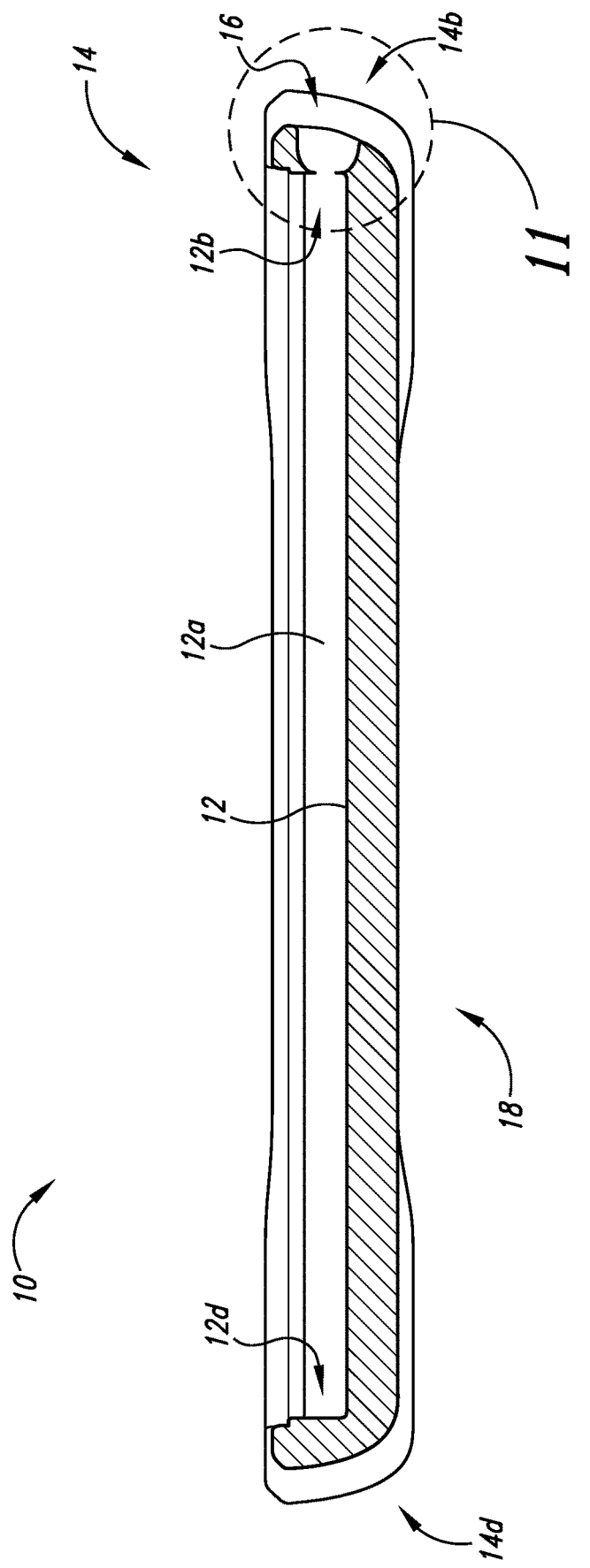
FIG. 10 is a cross-sectional view of the device case assembly of FIG. 8 taken along the 10-10 cut line of FIG. 9.

Turning to FIG. 10, depicted therein is a cross-sectional view of device case assembly 10 taking along the 10-10 cut line of FIG. 9 shown to further include exterior base surface portion 18.

Figure 11:
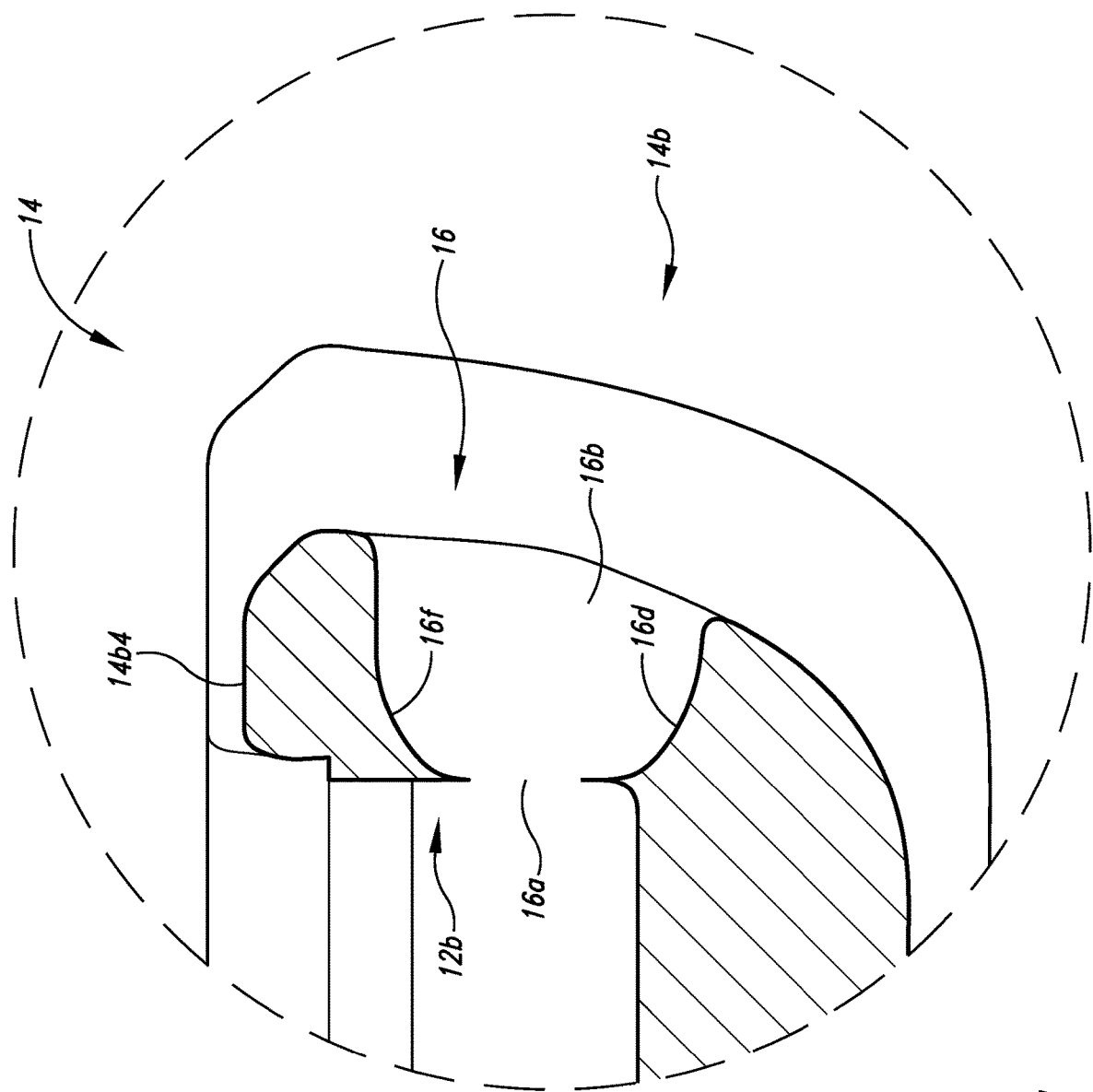
FIG. 11 is an enlarged view of the device case assembly of FIG. 8 taken along the dashed circle labeled "11" of FIG. 10.

Turning to FIG. 11, depicted therein is an enlarged view of a portion of device case assembly 10 taken along the dashed circle labeled 11-11 of FIG. 10 shown to further include beveled surface portion 16f.

Figure 12:
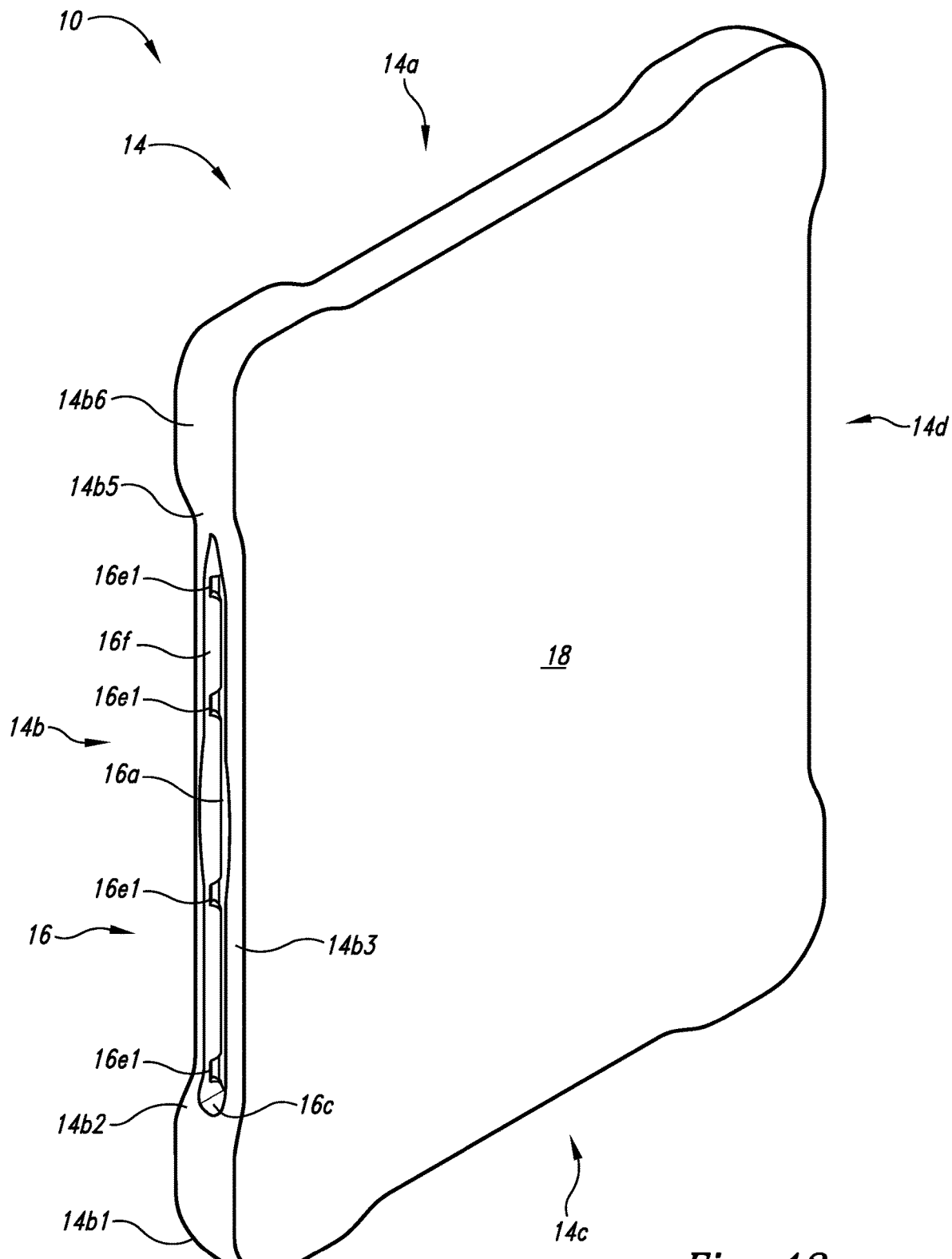
FIG. 12 is a rear-perspective view of the device case assembly of FIG. 8.

Turning to FIG. 12, depicted therein is a rear-perspective view of device case assembly 10 further including tab-receiving notch 16e1 and tab-receiving notch 16g.

Figure 13:
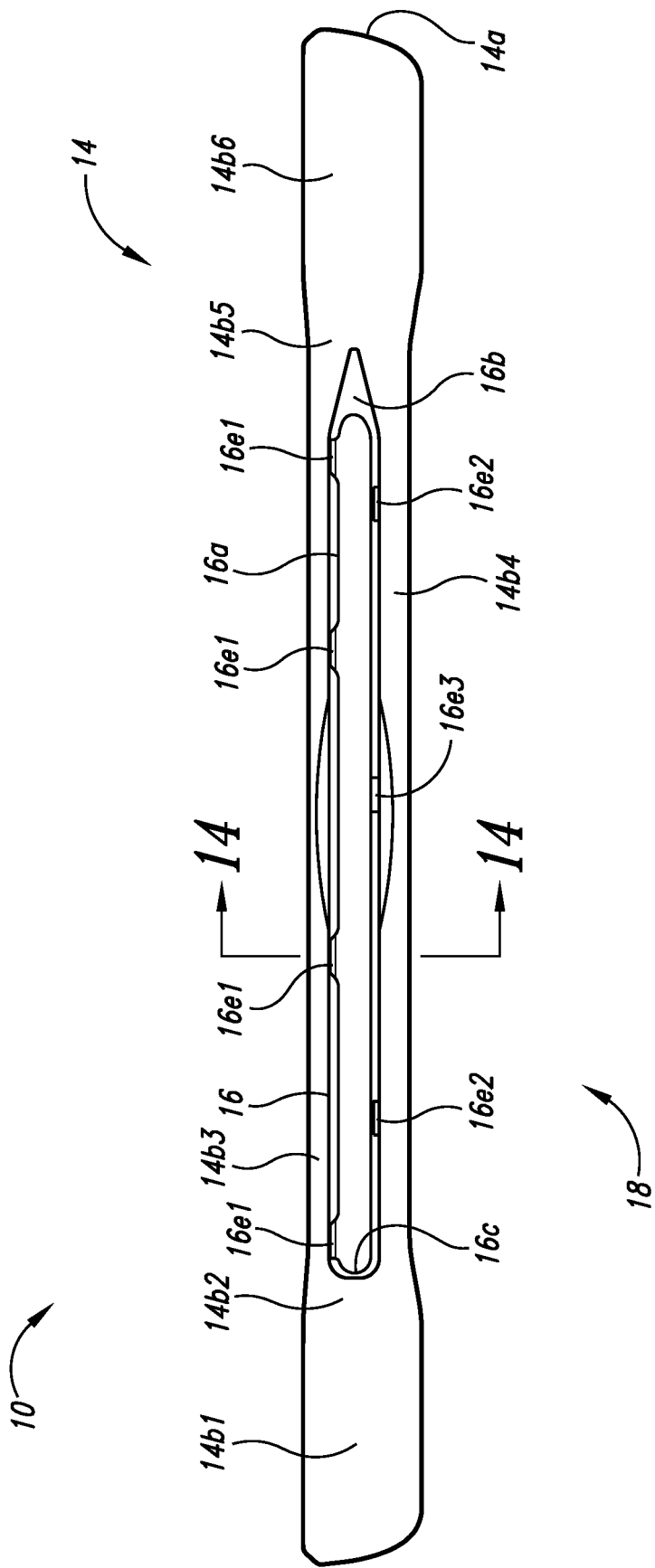
FIG. 13 is a side-elevational view of the device case assembly of FIG. 8.

Turning to FIG. 13, depicted therein is a side-elevational view of device case assembly 10.

Figure 14:
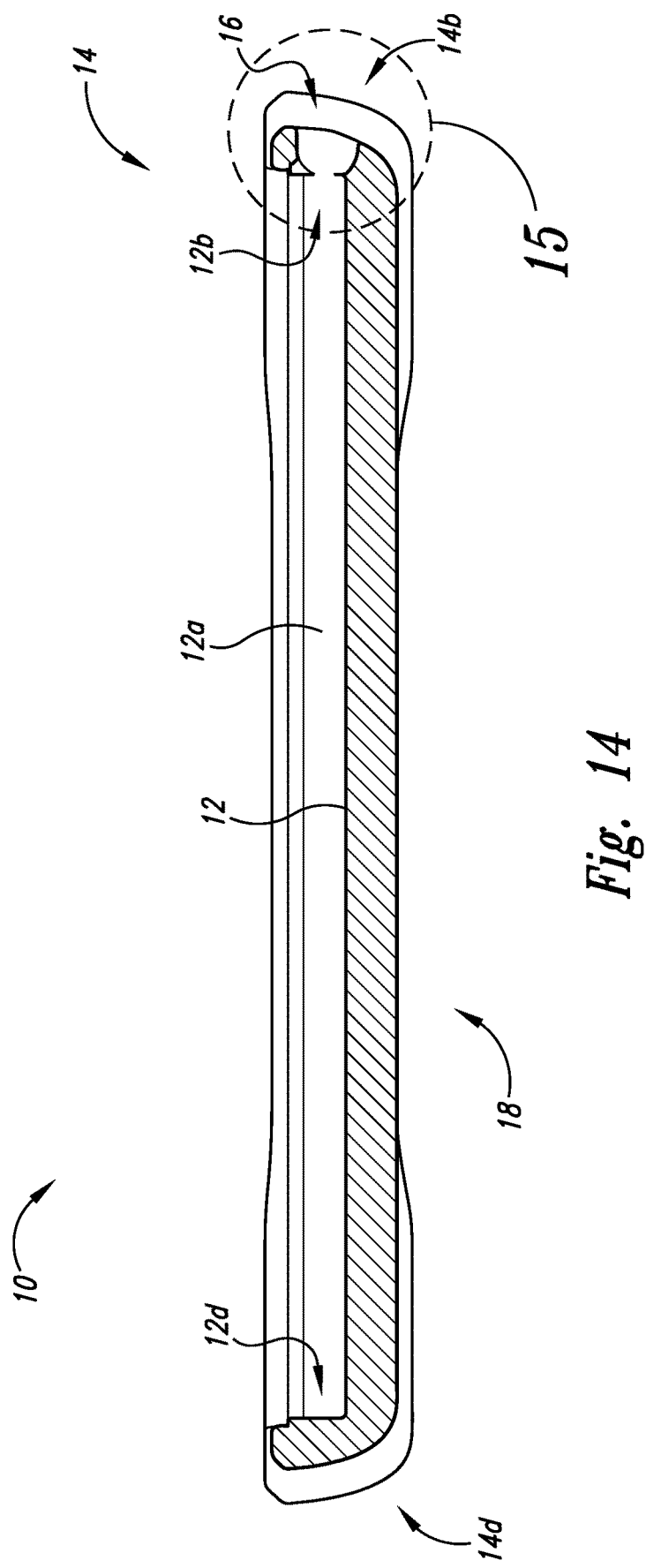
FIG. 14 is a cross-sectional of the device case assembly of FIG. 8 taken along the 14-14 cut line of FIG. 13.

Turning to FIG. 14, depicted therein is a cross-sectional view of device case assembly 10 taken along the 14-14 cut line of FIG. 13.

Figure 15:
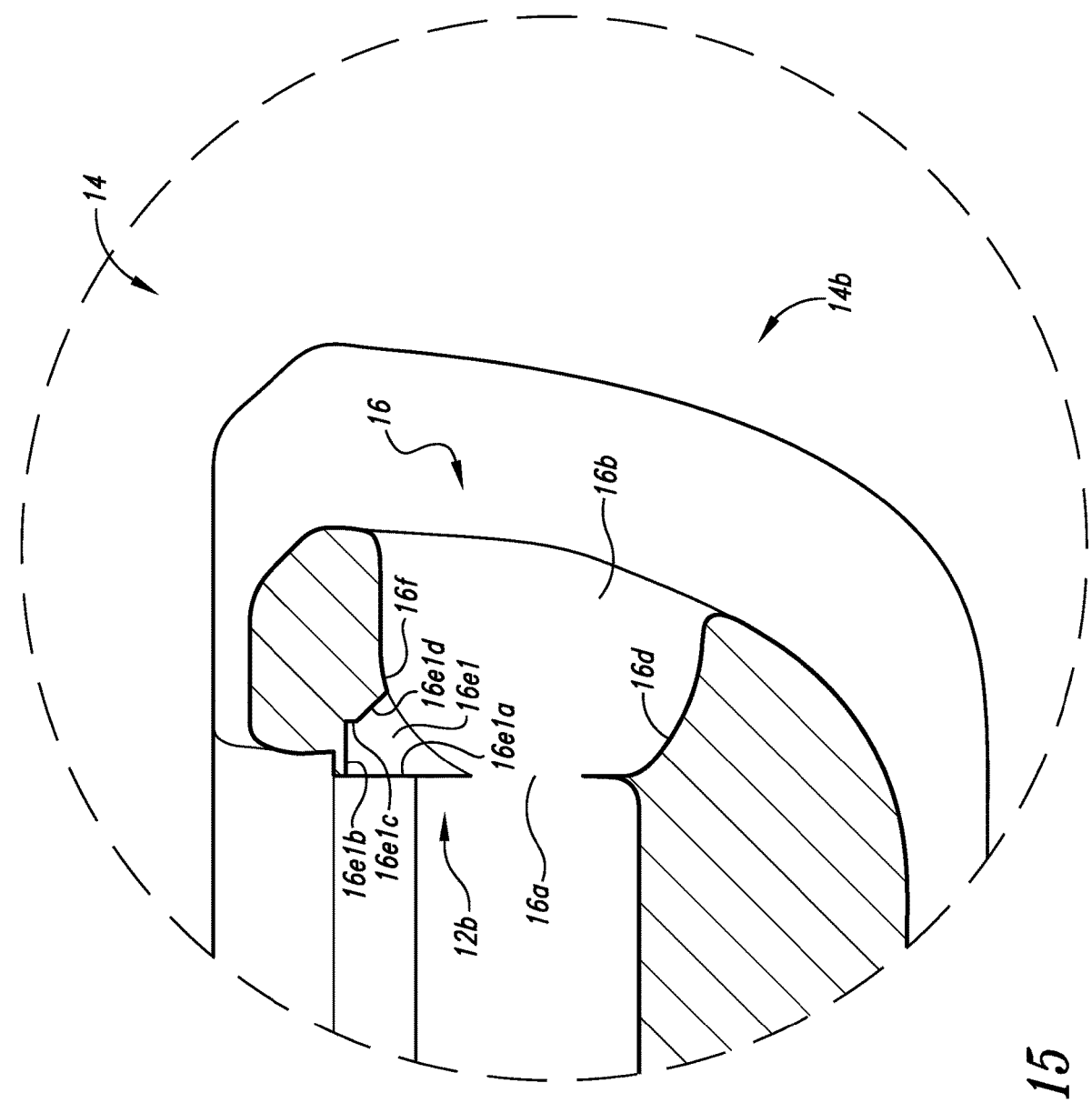
FIG. 15 is an enlarged view of the device case assembly of FIG. 8 taken along the dashed circle labeled "15" of FIG. 14.

Turning to FIG. 15, depicted therein is an enlarged view of a portion of device case assembly 10 taken along the dashed circle labeled "15" of FIG. 14 with tab-receiving notch 16e1 shown to include notch portion 16e1a and notch portion 16e1b, notch portion 16e1c, and notch portion 16e1d.

Figure 16:
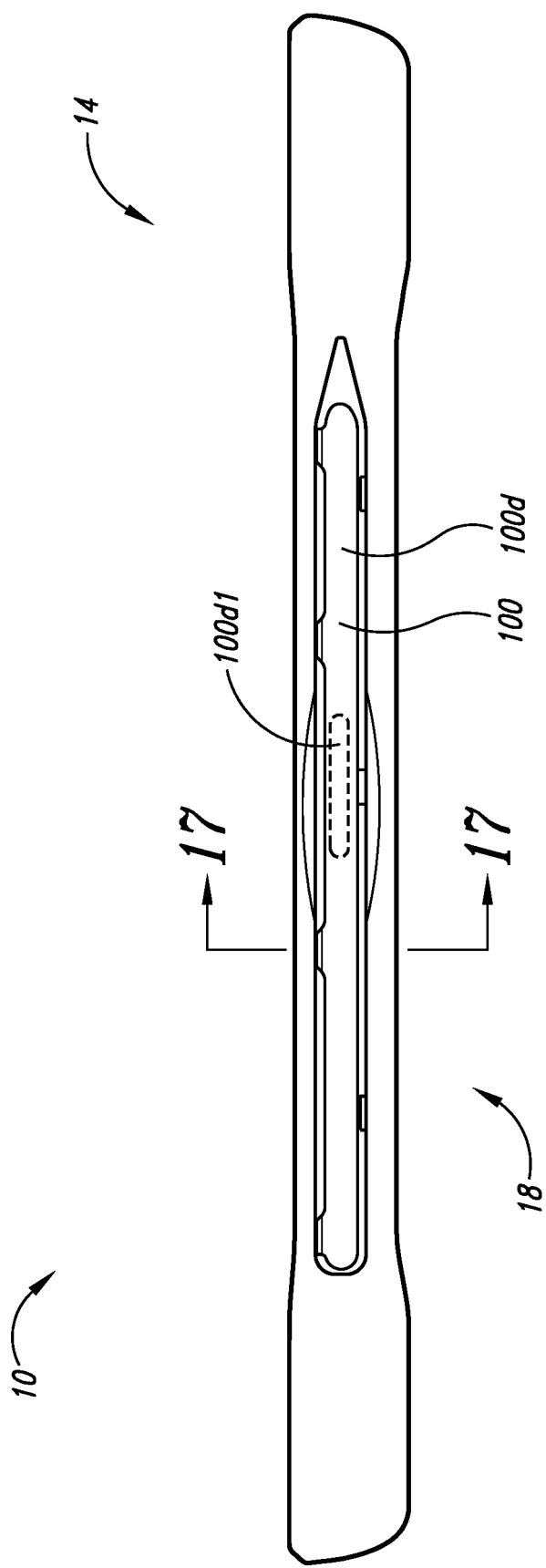
FIG. 16 is a side-elevational view of the device case assembly of FIG. 8 and portable electronic device of FIG. 1.

Turning to FIG. 16, depicted therein is a side-elevational view of device case assembly 10 and portable electronic device 100.

Figure 17:
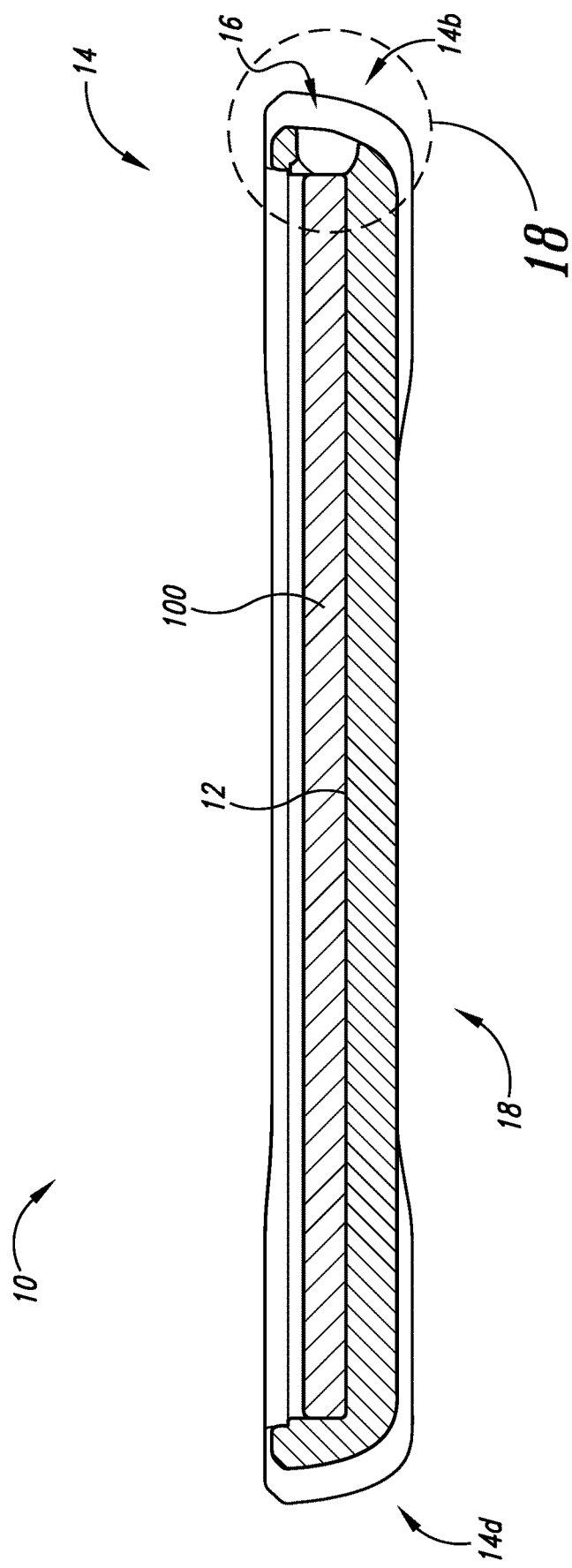
FIG. 17 is a cross-sectional of the device case assembly of FIG. 8 and portable electronic device of FIG. 1 taken along the 17-17 cut line of FIG. 16.

Turning to FIG. 17, depicted therein is a cross-sectional view of device case assembly 10 and portable electronic device 100 taken along the 17-17 cut line of FIG. 16.

Figure 18:
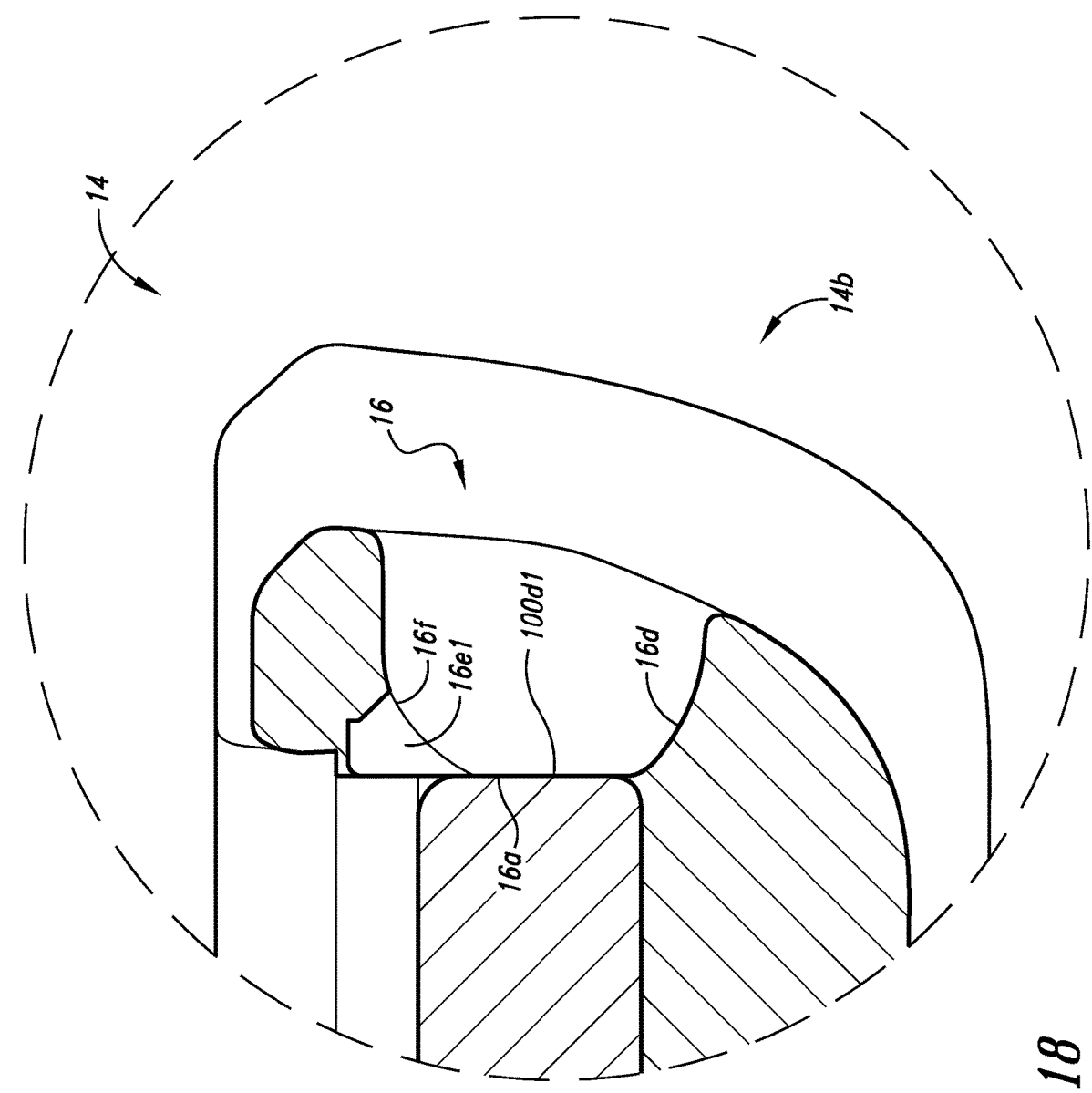
FIG. 18 is an enlarged view of the device case assembly of FIG. 8 and portable electronic device of FIG. 1 taken along the dashed circle labeled "18" of FIG. 17.

Turning to FIG. 18, depicted therein is an enlarged view of device case assembly 10 and portable electronic device 100 taken along the dashed circle labeled "18" of FIG. 17.

Figure 19:
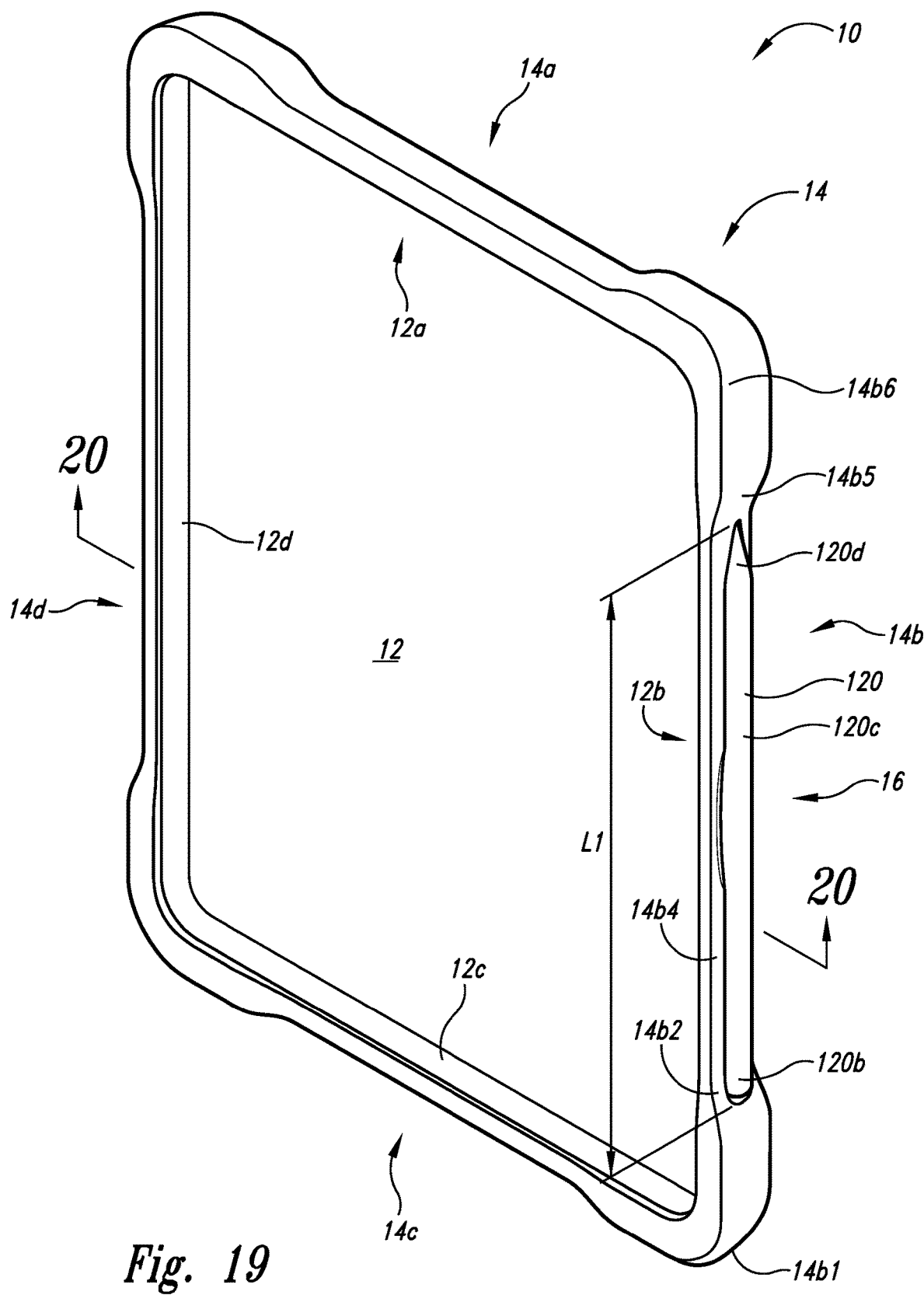
FIG. 19 is a front-perspective view of the device case assembly of FIG. 8 and the portable electronic device stylus of FIG. 3.

Turning to FIG. 19, depicted therein is a front-perspective view of device case assembly 10 and portable electronic device stylus 120.

Figure 20:
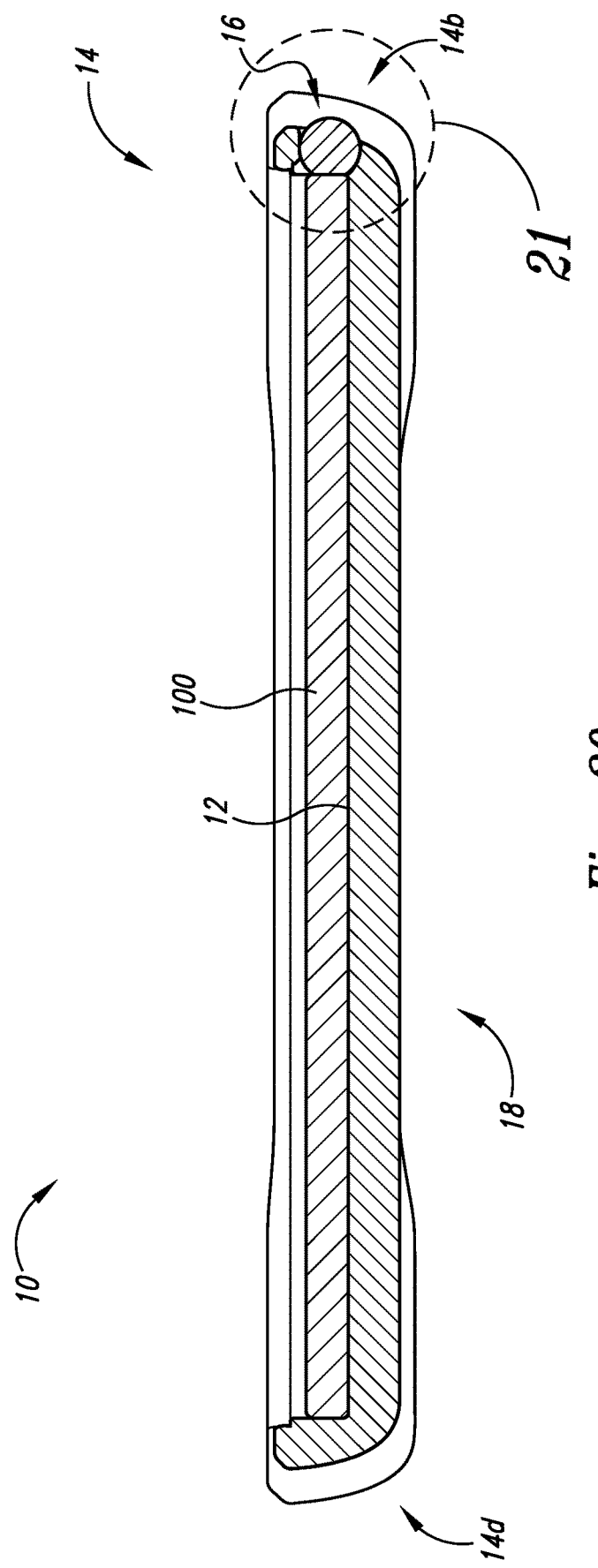
FIG. 20 is a cross-sectional view of the device case assembly of FIG. 8 and the portable electronic device stylus of FIG. 3 taken along the 20-20 cut line of FIG. 19.

Turning to FIG. 20, depicted therein is a cross-sectional view of device case assembly 10 and portable electronic device stylus 120 taken along the 20-20 cut line of FIG. 19.

Figure 21:
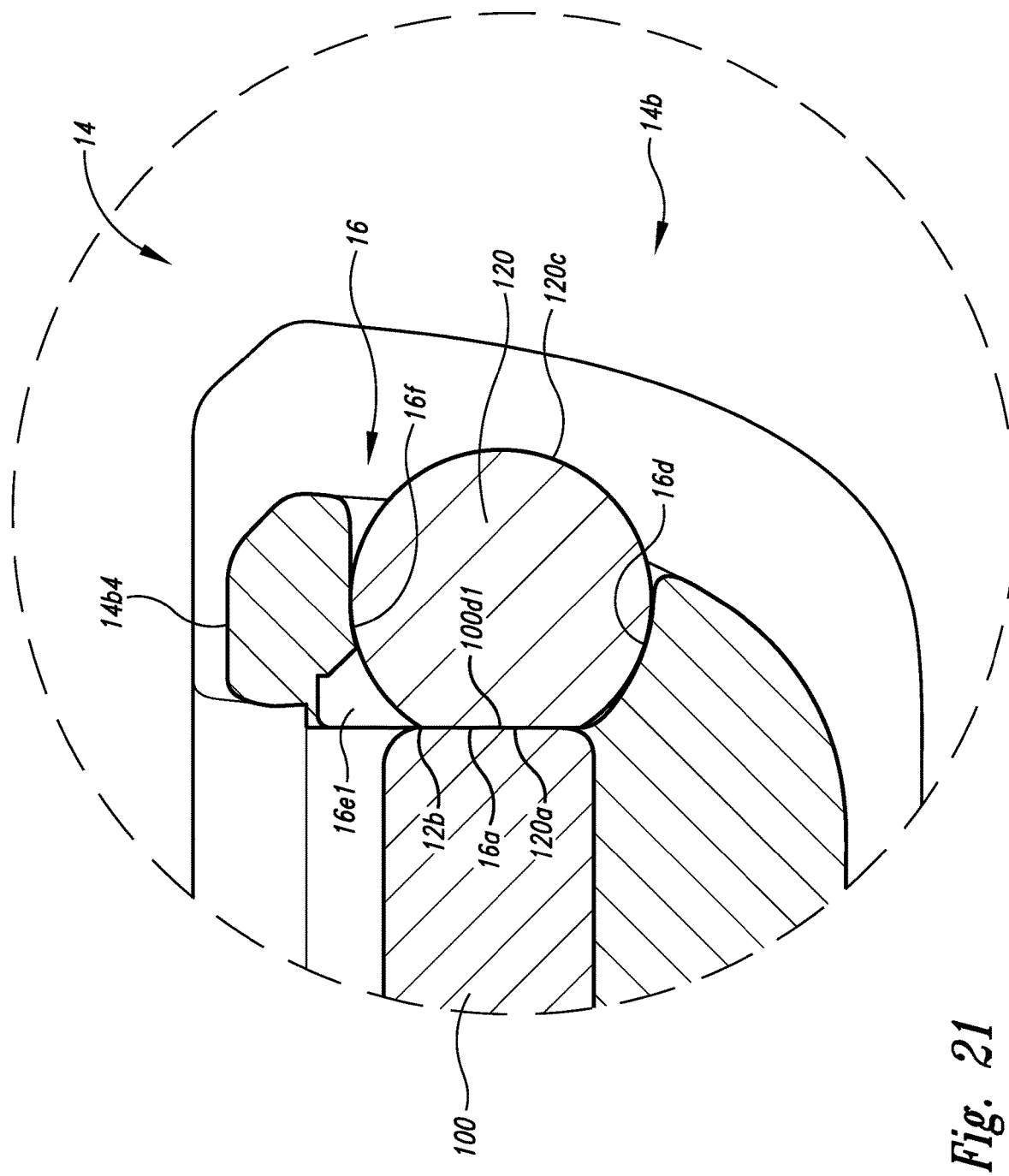
FIG. 21 is an enlarged view of the device case assembly of FIG. 8 and the portable electronic device stylus of FIG. 3 taken along the dashed circle labeled "21" of FIG. 20.

Turning to FIG. 21, depicted therein is an enlarged view of device case assembly 10 and portable electronic device stylus 120 taken along the dashed circle labeled "21" of FIG. 20.

Figure 22:
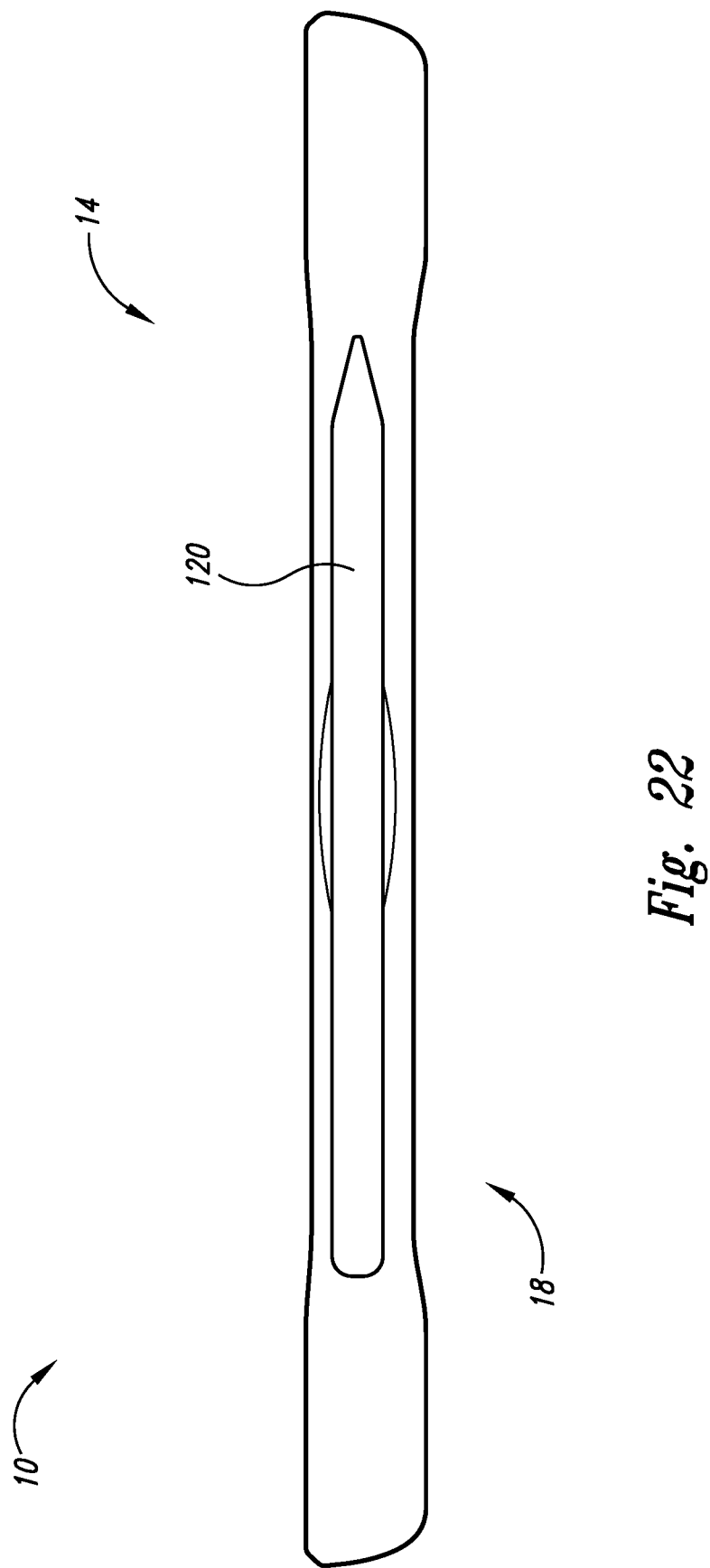
FIG. 22 is a side-elevational view of the device case assembly of FIG. 8 and the portable electronic device stylus of FIG. 3.

Turning to FIG. 22, depicted therein is a side-elevational view of device case assembly 10 and portable electronic device stylus 120.

Figure 23:
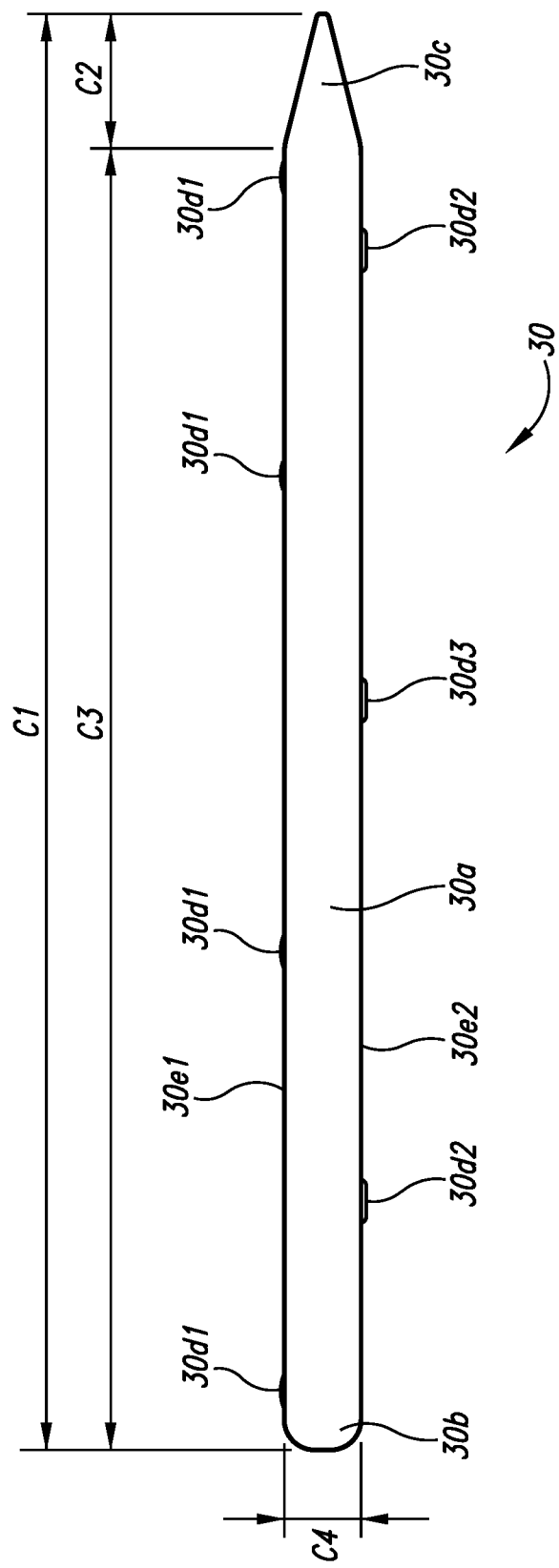
FIG. 23 is a top-plan view of a cover assembly.

Turning to FIG. 23, depicted therein is a top-plan view of cover assembly 30 including curvilinear surface 30a, end 30b, pointed tip 30c, tab 30d1, tab 30d2, side 30e1, and side 30e2. The cover assembly 30 is shown to further include linear dimension C1, linear dimension C2, linear dimension C3, and linear dimension C4. Implementations of one or more portions of cover assembly 30 can include at least one of the following materials: rigid plastic, polycarbonate, acrylonitrile butadiene styrene, thermoplastic polymer, thermoplastic polyurethane, polyethylene terephthalate, and nylon.

Figure 24:
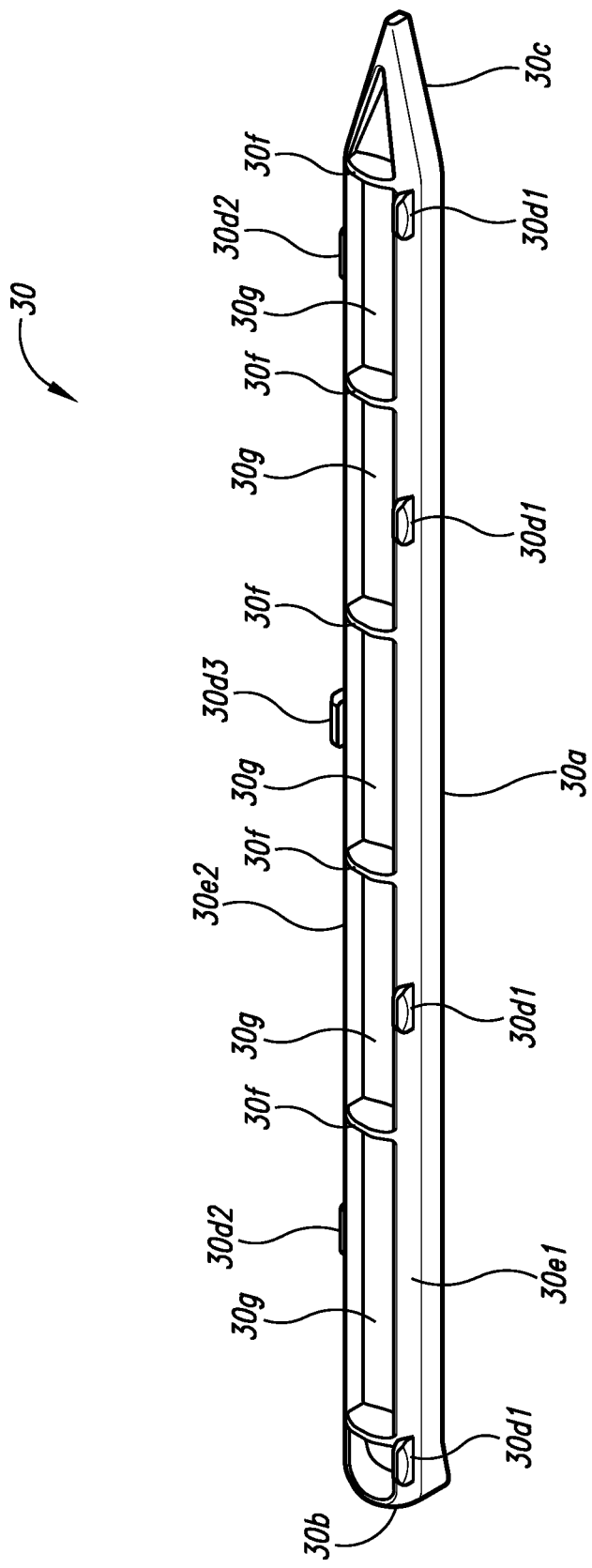
FIG. 24 is a rear-perspective view of the cover assembly of FIG. 23.

Turning to FIG. 24, depicted therein is a rear-perspective view of cover assembly 30 shown to further include support 30f, and void 30g.

Figure 25:
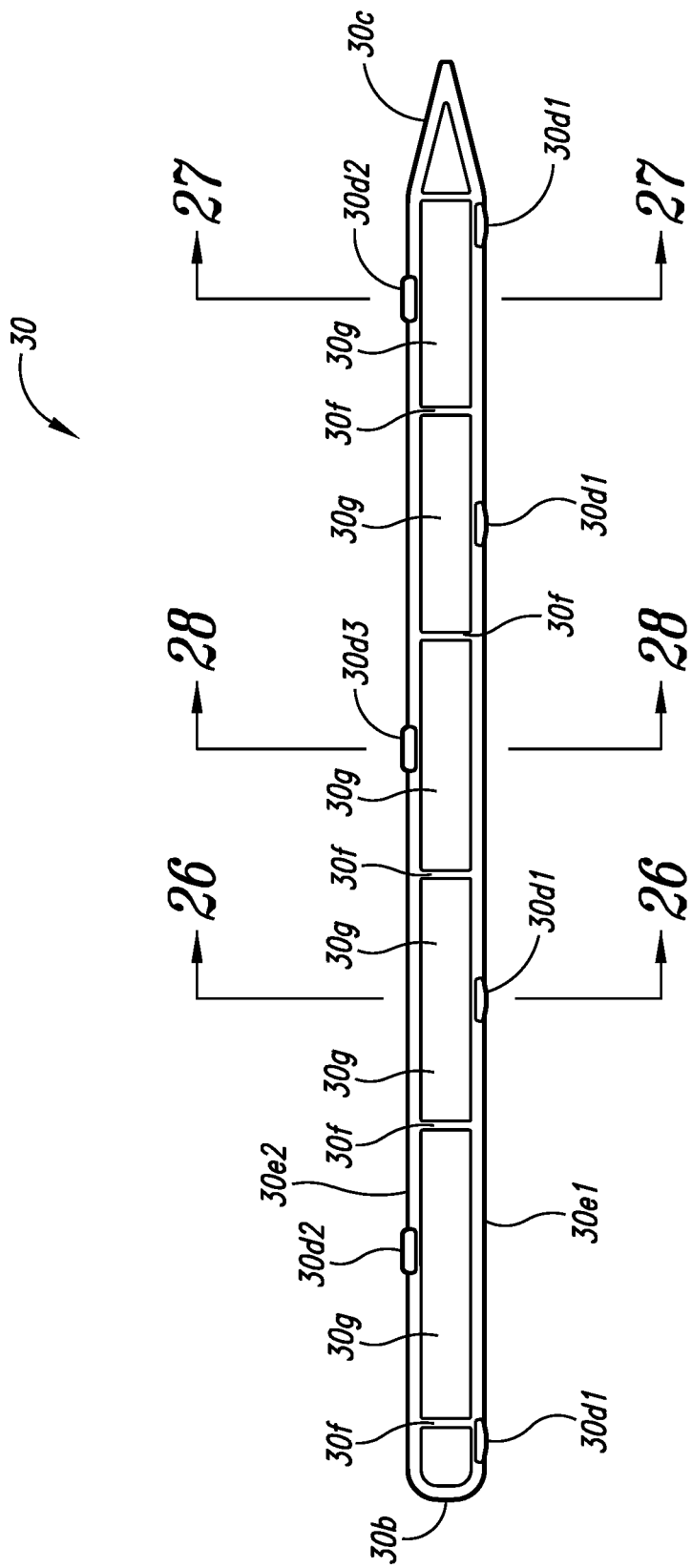
FIG. 25 is a bottom-plan view of the cover assembly of FIG. 23.

Turning to FIG. 25, depicted therein is a bottom-plan view of cover assembly 30.

Figure 26:
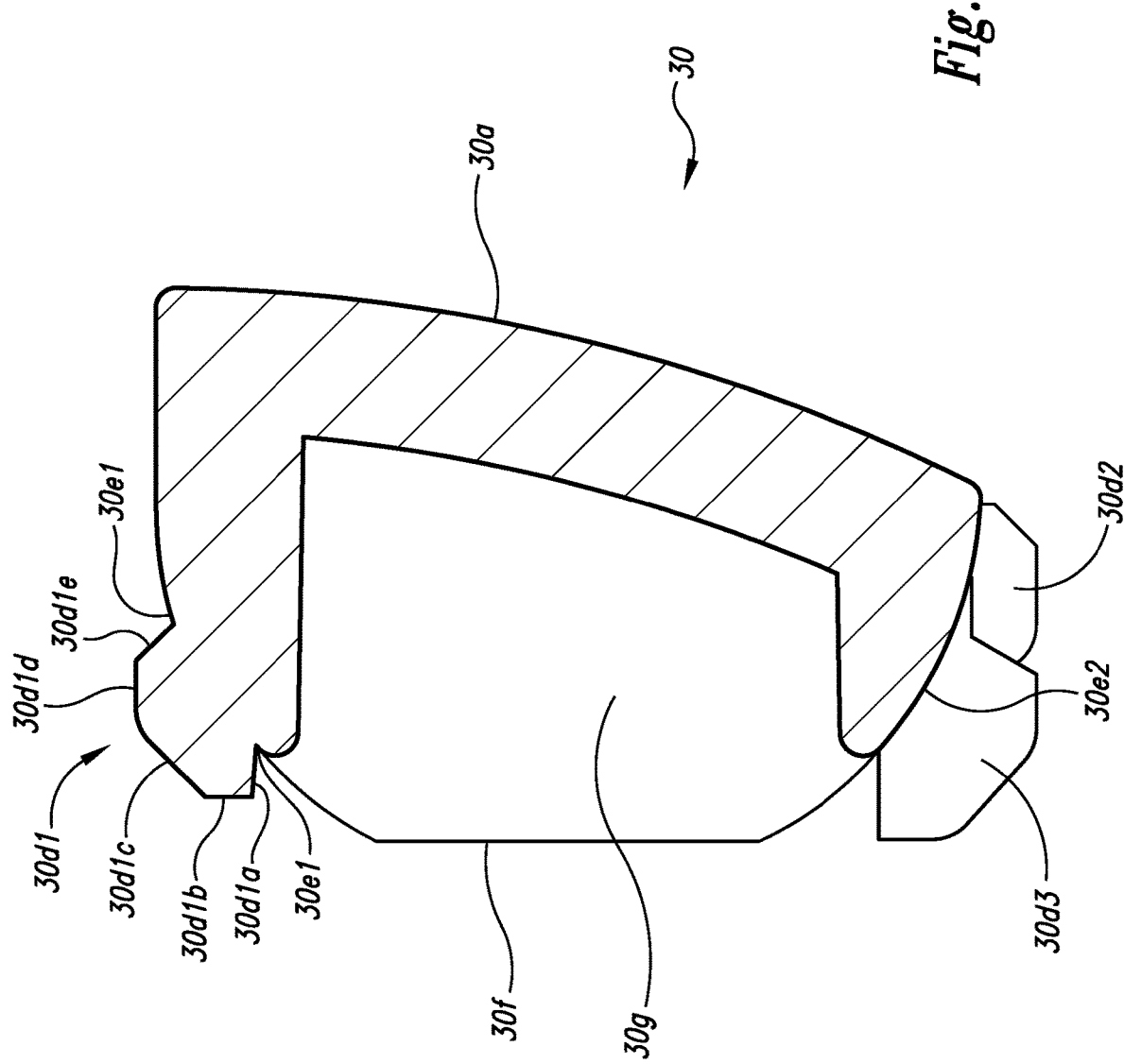
FIG. 26 is a cross-sectional view of the cover assembly of FIG. 23 taken along the 26-26 cut line of FIG. 25.

Turning to FIG. 26, depicted therein is a cross-sectional view of the cover assembly of FIG. 23 taken along the 26-26 cut line of FIG. 25 with tab 30d1 shown to include tab portion 30d1a, tab portion 30d1b, tab portion 30d1c, tab portion 30d1d, and tab portion 30d1e.

Figure 27:
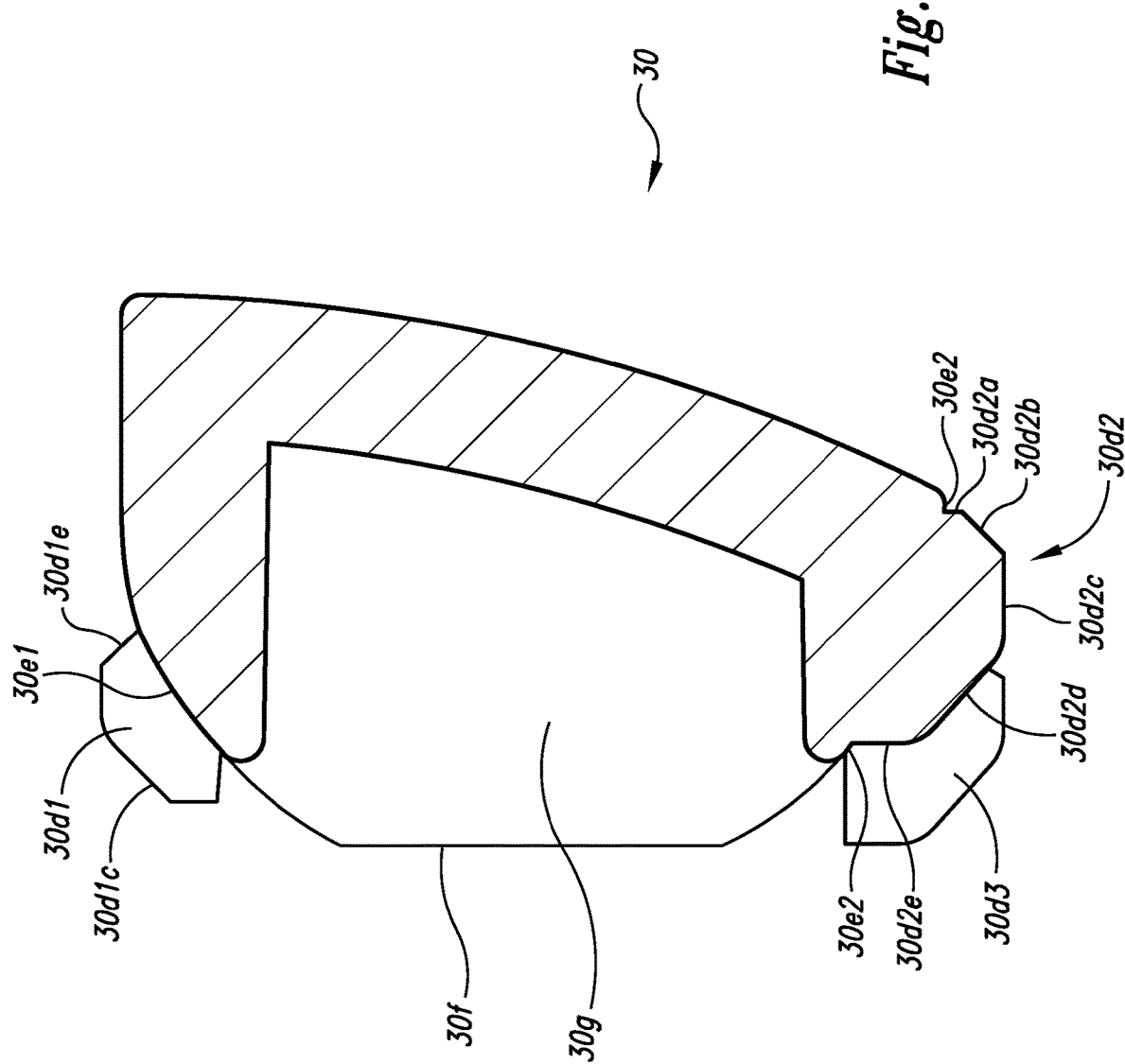
FIG. 27 is a cross-sectional view of the cover assembly of FIG. 23 taken along the 27-27 cut line of FIG. 25.

Turning to FIG. 27, depicted therein is a cross-sectional view of the cover assembly of FIG. 23 taken along the 27-27 cut line of FIG. 25 with tab 30d1 shown to include tab portion 30d2a, tab portion 30d2b, tab portion 30d2c, tab portion 30d2d, and tab portion 30d2e.

Figure 28:
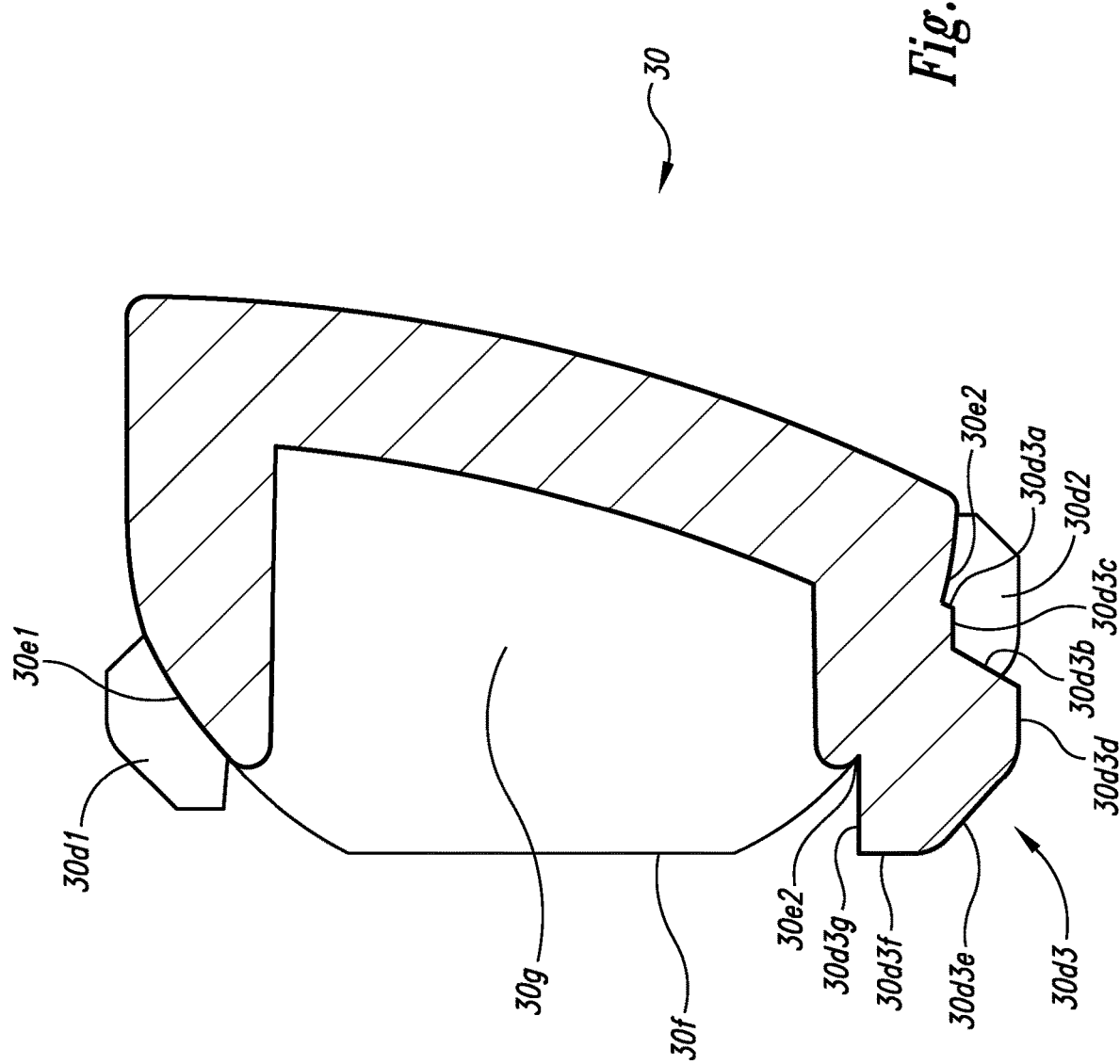
FIG. 28 is a cross-sectional view of the cover assembly of FIG. 23 taken along the 28-28 cut line of FIG. 25.

Turning to FIG. 28, depicted therein is a cross-sectional view of the cover assembly of FIG. 23 taken along the 28-28 cut line of FIG. 25 with tab 30d1 shown to include tab portion 30d3a, tab portion 30d3b, tab portion 30d3c, tab portion 30d3d, tab portion 30d3e, tab portion 30d3f, and tab portion 30d3g.

Figure 29:
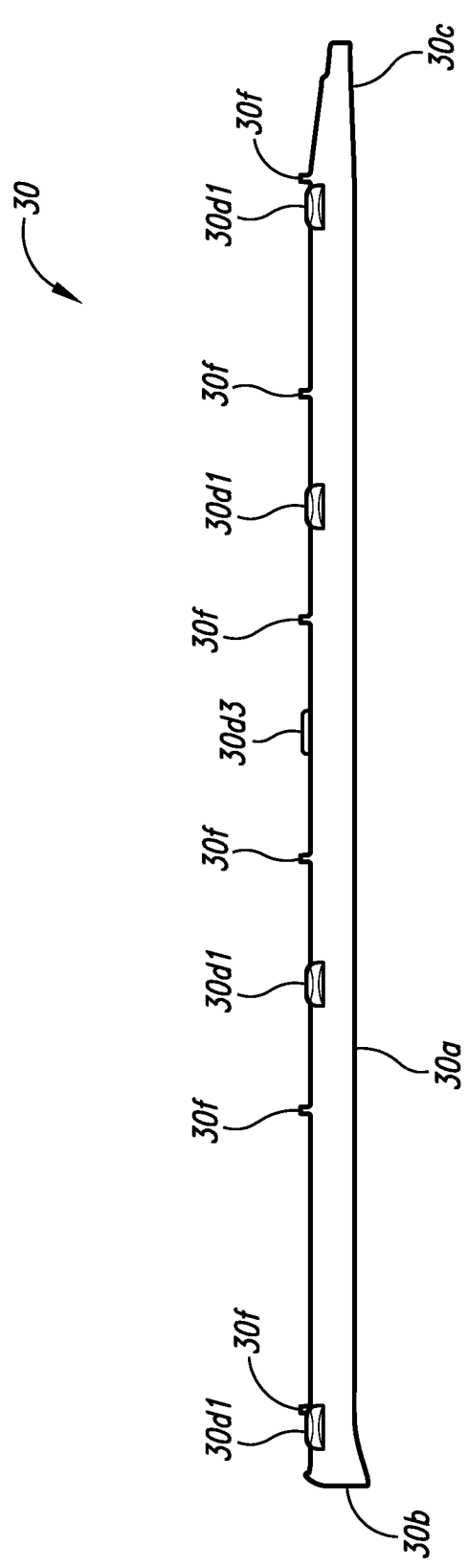
FIG. 29 is a side-elevational view of the cover assembly of FIG. 23.

Turning to FIG. 29, depicted therein is a side-elevational view of cover assembly 30.

Figure 30:
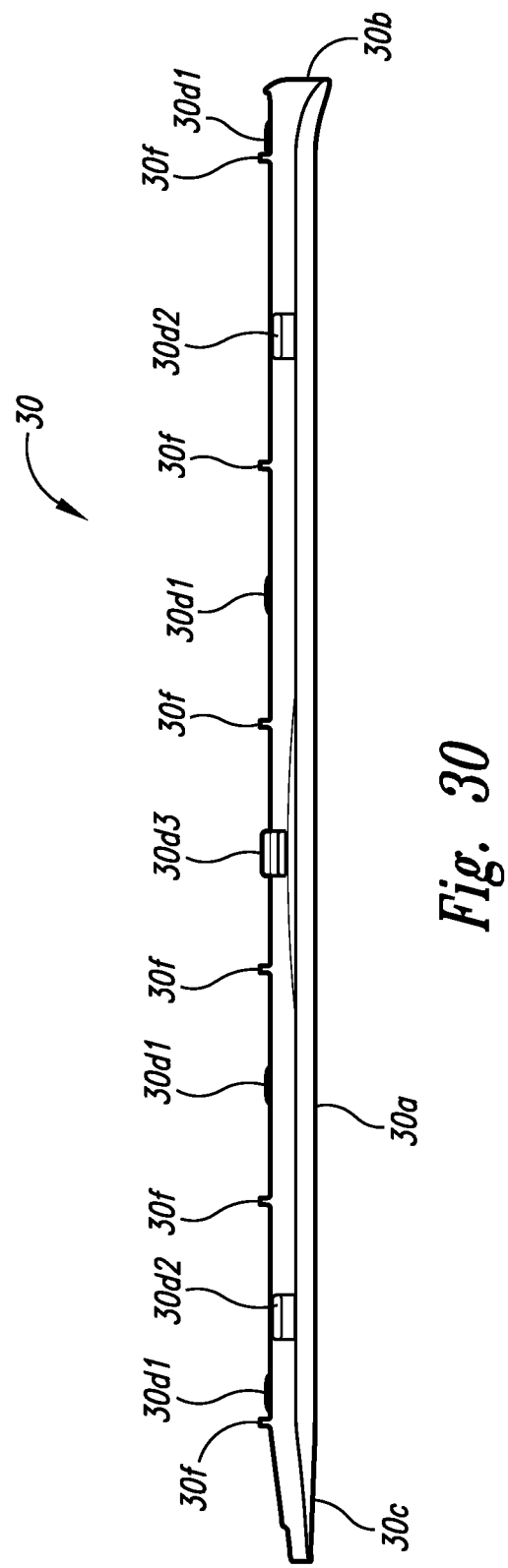
FIG. 30 is a side-elevational view of the cover assembly of FIG. 23.

Turning to FIG. 30, depicted therein is a side-elevational view of cover assembly 30.

Figure 31:
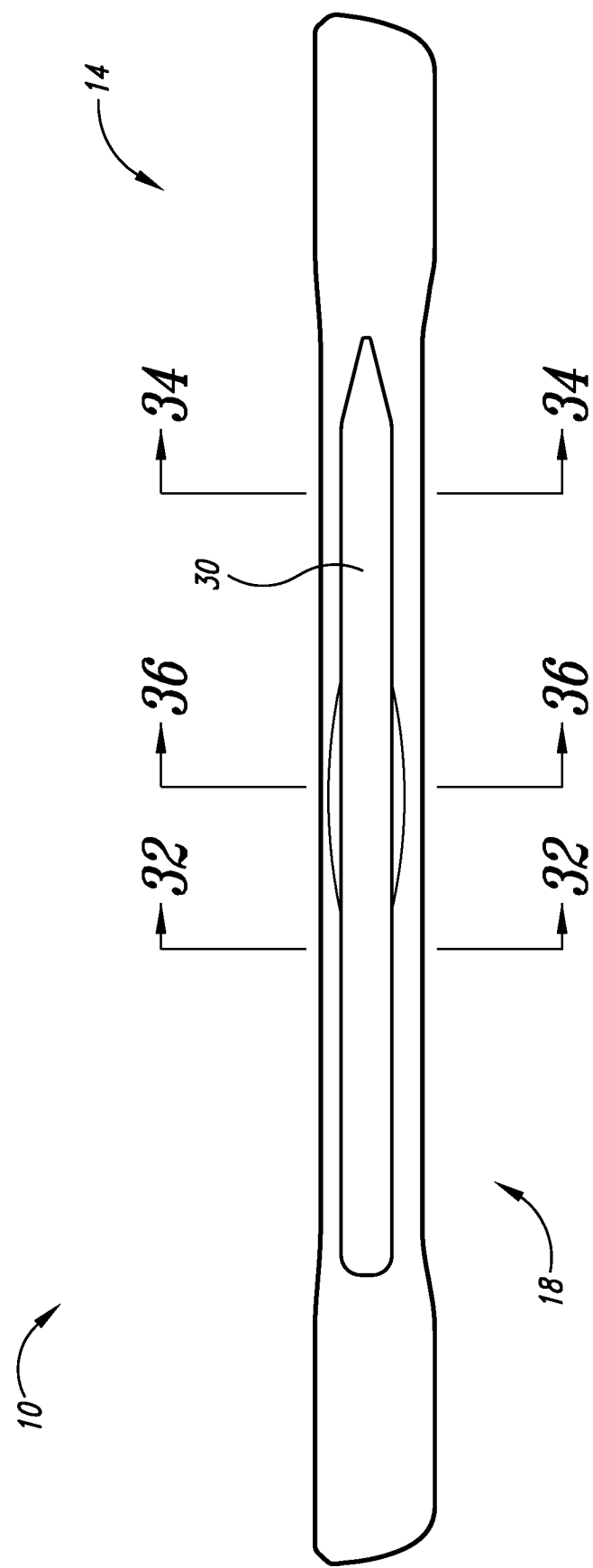
FIG. 31 is a side-elevational view of the device case assembly of FIG. 8 and the cover assembly of FIG. 23.

Turning to FIG. 31, depicted therein is a side-elevational view of device case assembly 10 and cover assembly 30.

Figure 32:
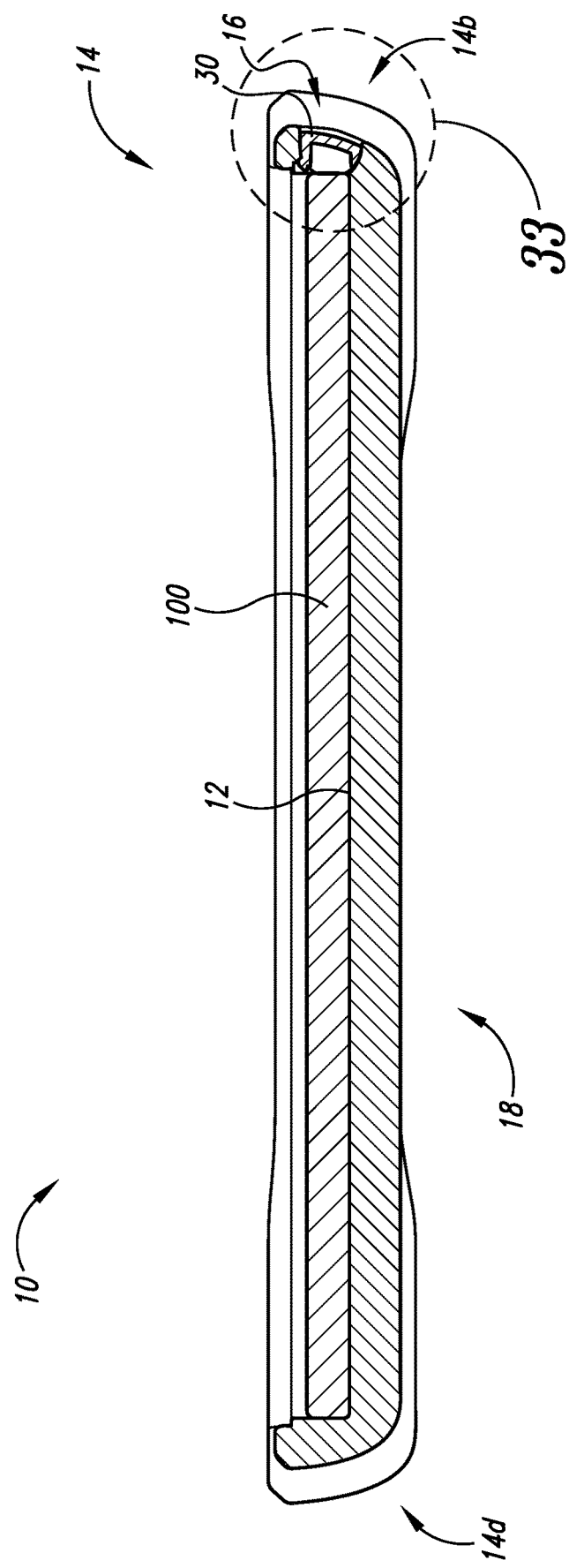
FIG. 32 is a cross-sectional view of the device case assembly of FIG. 8 and the cover assembly of FIG. 23 taken along the 32-32 cut line of FIG. 31.

Turning to FIG. 32, depicted therein is a cross-sectional of device case assembly 10 and cover assembly 30 taken along the 32-32 cut line of FIG. 31.

Figure 33:
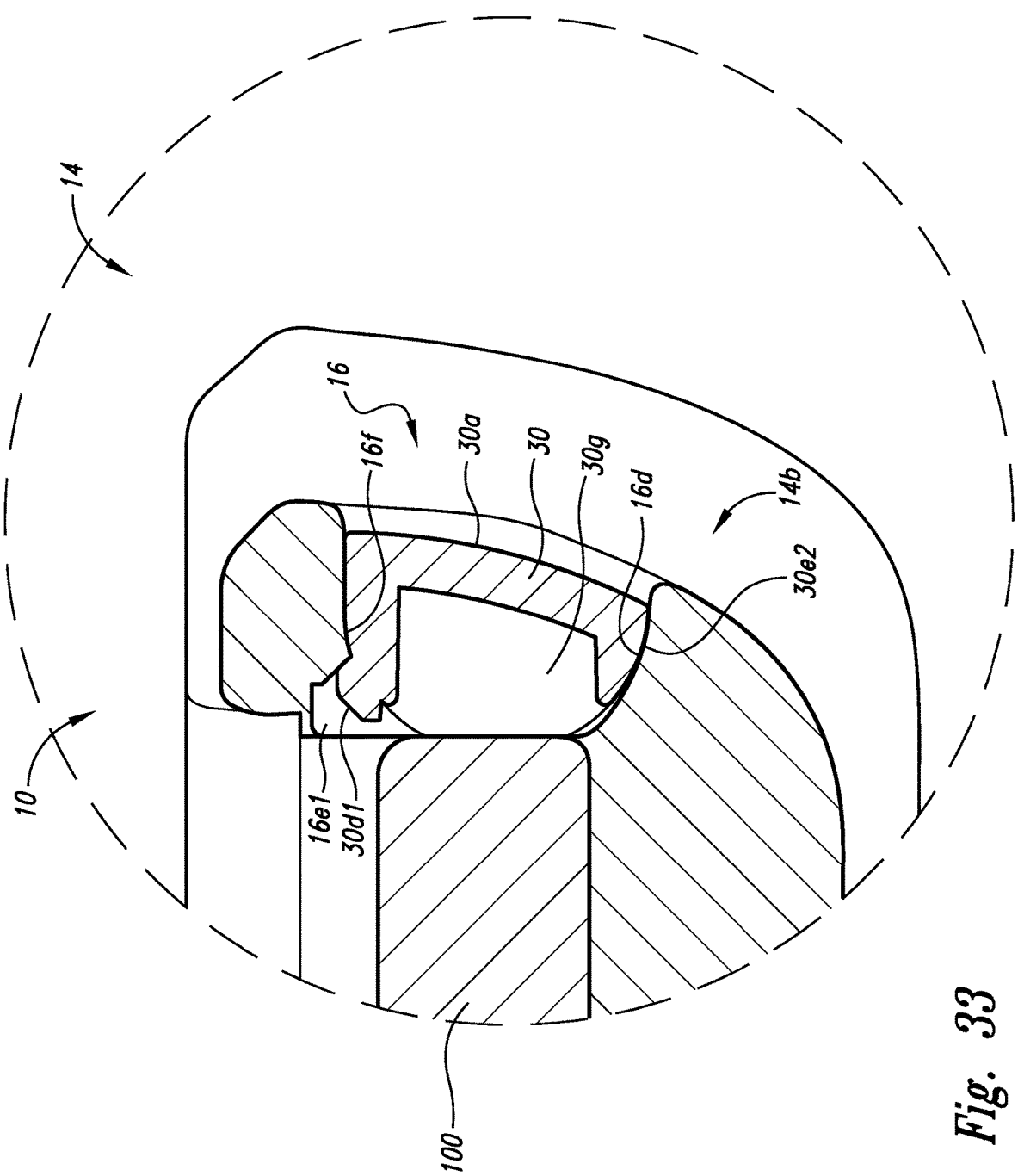
FIG. 33 is an enlarged view of the device case assembly of FIG. 8 and the cover assembly of FIG. 23 taken along the dashed circle labeled "33" of FIG. 32.

Turning to FIG. 33, depicted therein is an enlarged view of the device case assembly of FIG. 8 and the cover assembly of FIG. 23 taken along the dashed circle labeled "33" of FIG. 32.

Figure 34:
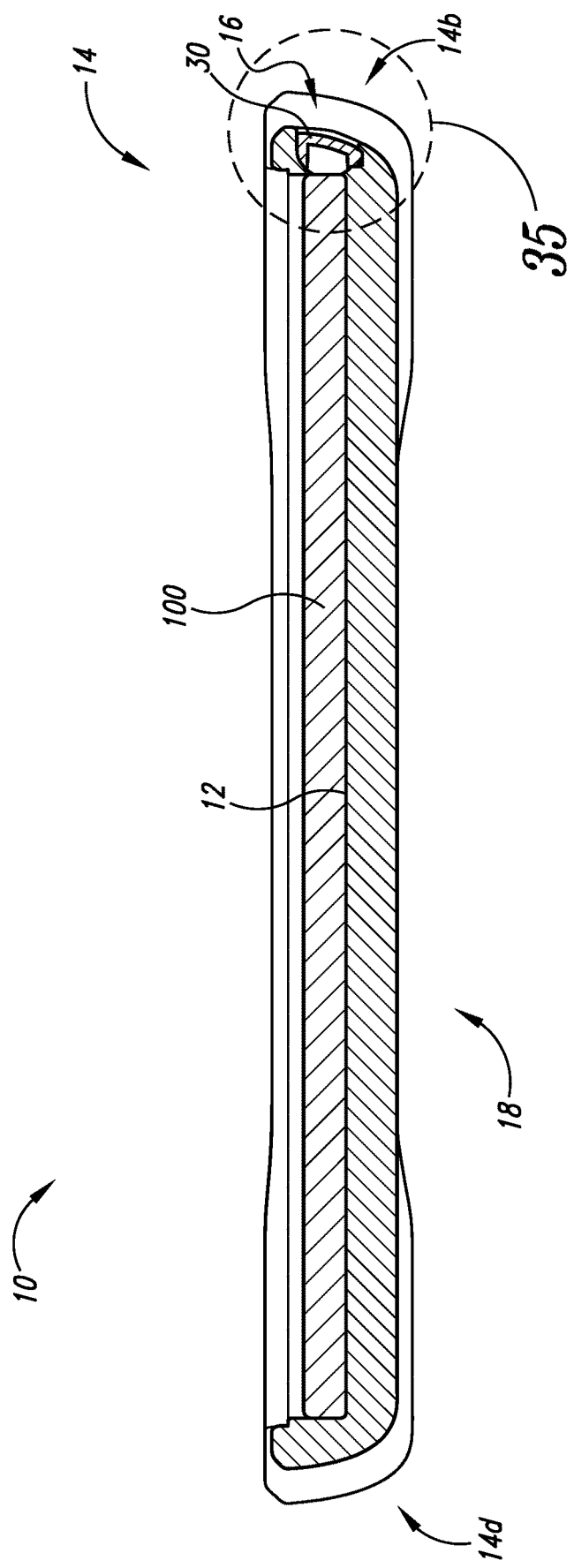
FIG. 34 is a cross-sectional of the device case assembly of FIG. 8 and the cover assembly of FIG. 23 taken along the 34-34 cut line of FIG. 31.

Turning to FIG. 34, depicted therein is a cross-sectional of the device case assembly of FIG. 8 and the cover assembly of FIG. 23 taken along the 34-34 cut line of FIG. 31.

Figure 35:
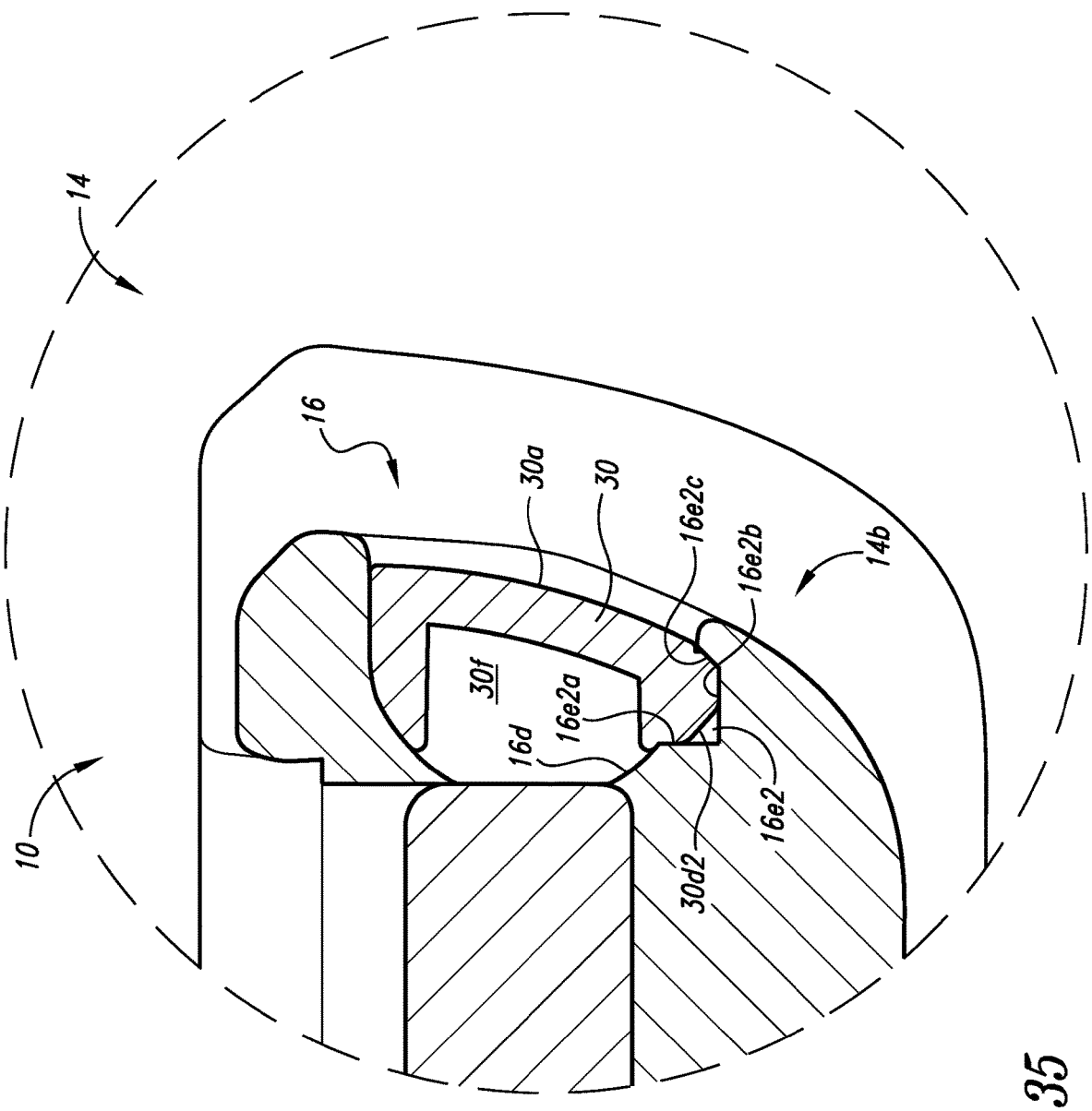
FIG. 35 is an enlarged view of the device case assembly of FIG. 8 and the cover assembly of FIG. 23 taken along the dashed circle labeled "35" of FIG. 34.

Turning to FIG. 35, depicted therein is an enlarged view of the device case assembly of FIG. 8 and the cover assembly of FIG. 23 taken along the dashed circle labeled "35" of FIG. 34 with tab-receiving notch 16e2 shown to include notch portion 16e2a, notch portion 16e2b, and notch portion 16e2c.

Figure 36:
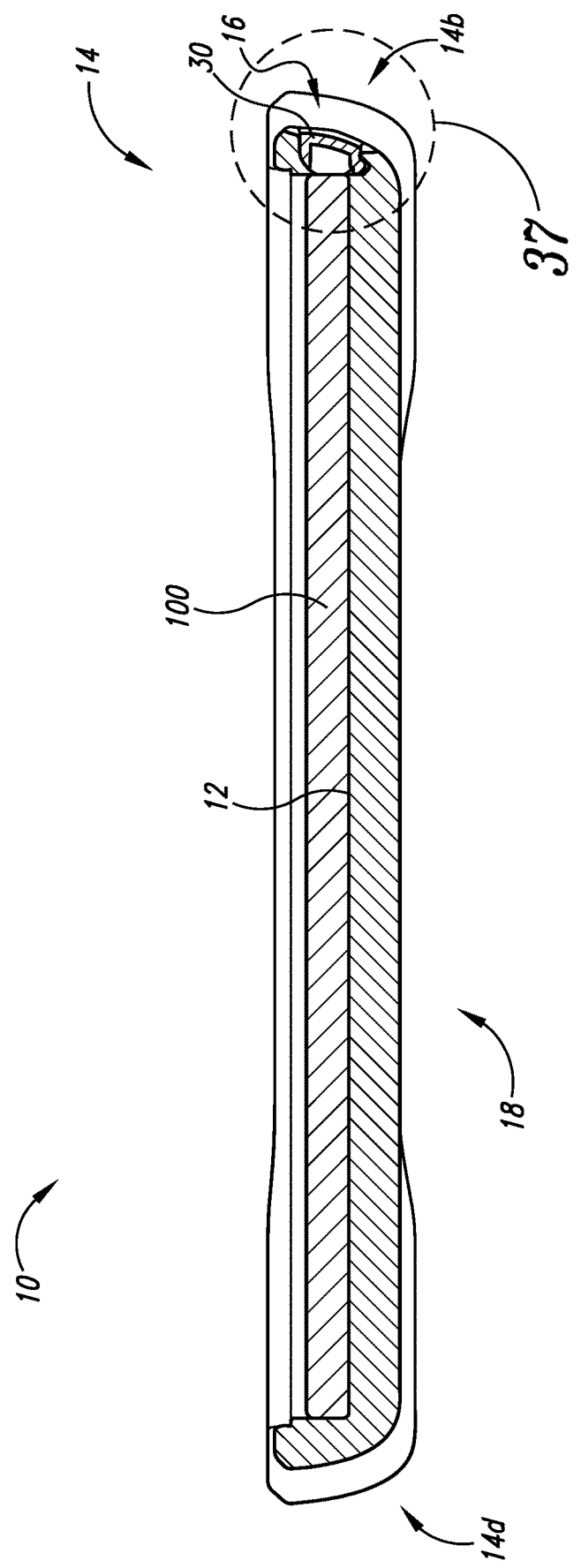
FIG. 36 is a cross-sectional of the device case assembly of FIG. 8 and the cover assembly of FIG. 23 taken along the 36-36 cut line of FIG. 31.

Turning to FIG. 36, depicted therein is a cross-sectional of the device case assembly of FIG. 8 and the cover assembly of FIG. 23 taken along the 36-36 cut line of FIG. 31.

Figure 37:
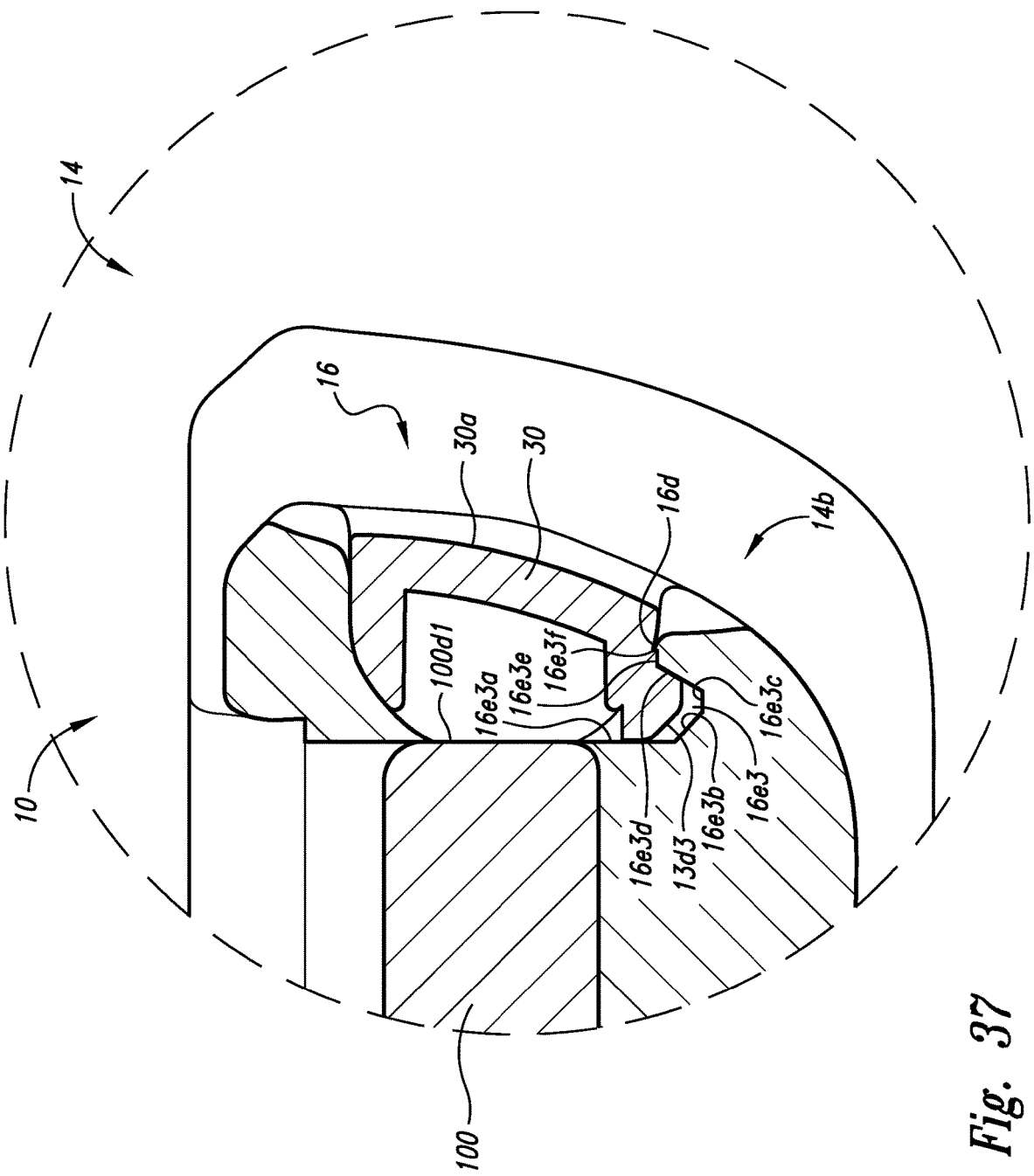
FIG. 37 is an enlarged view of the device case assembly of FIG. 8 and the cover assembly of FIG. 23 taken along the dashed circle labeled "37" of FIG. 36.

Turning to FIG. 37, depicted therein is an enlarged view of the device case assembly of FIG. 8 and the cover assembly of FIG. 23 taken along the dashed circle labeled "37" of FIG. 36 with tab-receiving notch 16e3 shown to include notch portion 16e3a, notch portion 16e3b, notch portion 16e3c, notch portion 16e3d, notch portion 16e3e, and notch portion 16e3f.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system for a portable electronic computing device, the system comprising:
   (I) a case assembly including
      (A) at least one interior base surface including an internal length dimension, the internal length dimension of the interior base surface including a plurality of portions,
      (B) a first side including at least one first interior wall portion and at least one first exterior wall portion with the at least one first interior wall portion angularly extending relative to the at least one interior base surface,
      (C) a second side extending along the internal length dimension of the at least one interior base surface, the second side including at least one second interior wall portion and at least one second exterior wall portion with the at least one second interior wall portion angularly extending relative to the at least one interior base surface, and
      (D) a third side including at least one third interior wall portion and at least one third exterior wall portion with the at least one third interior wall portion angularly extending relative to the at least one interior base surface, wherein the internal length dimension of the internal base surface extends from the first interior wall portion to the third interior wall portion, wherein the at least one first interior wall portion extends perpendicularly to the second interior wall portion, wherein the at least one first interior wall portion extends parallel with the at least one third interior wall portion, and (E) an elongated aperture extending in a first direction through the at least one second interior wall portion and through the at least one second exterior wall portion of the second side, the elongated aperture extending an elongated linear dimension in a second direction perpendicular to the first direction, the second direction being parallel with the internal length dimension of the internal base surface, the elongated linear dimension of the elongated aperture being on the largest of the plurality of portions of the internal length dimension of the internal base surface; and (II) a cover assembly sized and shaped to cover the elongated aperture of the case assembly when the cover assembly is coupled with the case assembly.

2. The system of claim 1 wherein the at least one second exterior wall portion of the case assembly includes at least one tab-receiving notch.

3. The system of claim 2 wherein the cover assembly includes at least one tab sized and shaped to be received by the at least one tab-receiving notch of the at least one second exterior wall portion.

4. The system of claim 2 wherein the at least one tab-receiving notch is positioned on the at least one second exterior wall portion adjacent the elongated aperture of the case assembly.

5. The system of claim 4 wherein the at least one second exterior wall portion includes at least one beveled surface portion extending adjacent the elongated aperture and parallel with the internal length dimension of the internal base surface and wherein the at least one tab-receiving notch is positioned on the at least one beveled surface portion.

6. The system of claim 5 wherein the elongated aperture and the least one beveled surface portion are shaped, sized, and positioned to receive at least one portable electronic device portable electronic device stylus.

7. The system of claim 1 wherein the elongated aperture extends in the second direction parallel with the internal length dimension of the internal base surface of the case assembly at least half the length of the internal length dimension of the internal base surface.

8. The system of claim 1 wherein the cover assembly including a length dimension at least as large as the elongated linear dimension of the elongated aperture.

9. The system of claim 8 wherein the length dimensions of the cover assembly is at least five inches and the elongated linear dimension of the elongated aperture is at least five inches.

10. The system of claim 1 wherein a top plan view of the cover assembly resembles a top plan view of at least one electronic device portable electronic device stylus.

11. The system of claim 1 wherein the cover assembly includes at least one concave surface.

12. The system of claim 1 wherein the cover assembly includes at least one internal brace.

13. The system of claim 1 wherein the cover assembly includes a pointed end.

14. The system of claim 1 wherein the cover assembly includes a rounded end.

15. A system for a portable electronic computing device, the system comprising:

(I) a case assembly including
(A) at least one interior base surface including an internal length dimension, the internal length dimension of the interior base surface including a plurality of portions,
(C) a second side extending along the internal length dimension of the at least one interior base surface, the second side including at least one second interior wall portion and at least one second exterior wall portion with the at least one second interior wall portion angularly extending relative to the at least one interior base surface, and wherein the at least one first interior wall portion extends perpendicularly to the second interior wall portion, and (E) an elongated aperture extending in a first direction through the at least one second interior wall portion and through the at least one second exterior wall portion of the second side, the elongated aperture extending an elongated linear dimension in a second direction perpendicular to the first direction, the second direction being parallel with the internal length dimension of the internal base surface, the elongated linear dimension of the elongated aperture being on the largest of the plurality of portions of the internal length dimension of the internal base surface.

16. The system of claim 15 wherein the at least one second exterior wall portion of the case assembly includes at least one tab-receiving notch positioned on the at least one second exterior wall portion adjacent the elongated aperture of the case assembly.

17. The system of claim 16 wherein the at least one second exterior wall portion includes at least one beveled surface portion extending adjacent the elongated aperture and parallel with the internal length dimension of the internal base surface and wherein the at least one tab-receiving notch is positioned on the at least one beveled surface portion.

18. A system for a portable electronic computing device, the system comprising:

(I) a case assembly including
(A) at least one interior base surface including an internal length dimension, the internal length dimension of the interior base surface including a plurality of portions,
(C) a second side extending along the internal length dimension of the at least one interior base surface, the second side including at least one second interior wall portion and at least one second exterior wall portion with the at least one second interior wall portion angularly extending relative to the at least one interior base surface, and wherein the at least one first interior wall portion extends perpendicularly to the second interior wall portion, and (E) an elongated aperture extending in a first direction through the at least one second interior wall portion and through the at least one second exterior wall portion of the second side, the elongated aperture extending an elongated linear dimension in a second direction perpendicular to the first direction, the second direction being parallel with the internal length dimension of the internal base surface, the elongated linear dimension of the elongated aperture being on the largest of the plurality of portions of the internal length dimension of the internal base surface; and (II) a cover assembly including a linear dimension at least as large as the elongated linear dimension of the elongated aperture.

19. The system of claim 18 wherein the cover assembly including a length dimension at least as large as the elongated linear dimension of the elongated aperture.

20. The system of claim 18 wherein a top plan view of the cover assembly resembles a top plan view of at least one electronic device portable electronic device stylus.

* * * * *